(12) United States Patent
Loveness et al.

(10) Patent No.: US 9,172,088 B2
(45) Date of Patent: Oct. 27, 2015

(54) MULTIDIMENSIONAL ELECTROCHEMICALLY ACTIVE STRUCTURES FOR BATTERY ELECTRODES

(75) Inventors: Ghyrn E. Loveness, East Palo Alto, CA (US); Constantin I. Stefan, San Jose, CA (US); Song Han, Foster City, CA (US)

(73) Assignee: Amprius, Inc., Sunnyvale, CA (US)

( * ) Notice: Subject to any disclaimer, the term of this patent is extended or adjusted under 35 U.S.C. 154(b) by 884 days.

(21) Appl. No.: 13/114,413

(22) Filed: May 24, 2011

(65) Prior Publication Data

US 2011/0287318 A1 Nov. 24, 2011

Related U.S. Application Data

(63) Continuation-in-part of application No. 13/039,031, filed on Mar. 2, 2011, now Pat. No. 8,257,866.

(60) Provisional application No. 61/347,614, filed on May 24, 2010.

(51) Int. Cl.
  *H01M 4/04* (2006.01)
  *H01M 4/58* (2010.01)
  (Continued)

(52) U.S. Cl.
  CPC .............. *H01M 4/38* (2013.01); *H01M 4/0428* (2013.01); *H01M 4/134* (2013.01);
  (Continued)

(58) Field of Classification Search
  CPC ..... H01M 4/38; H01M 4/0428; H01M 4/134; H01M 4/1395; H01M 4/366; H01M 4/587; H01M 4/622; H01M 4/66; H01M 10/05; H01M 10/0525

USPC ......... 429/218.1, 209, 231.8, 231.95; 427/77, 427/58, 528
See application file for complete search history.

(56) References Cited

U.S. PATENT DOCUMENTS

| | | | |
|---|---|---|---|
| 4,366,215 | A | 12/1982 | Coetzer et al. |
| 4,436,796 | A | 3/1984 | Huggins et al. |

(Continued)

FOREIGN PATENT DOCUMENTS

| | | |
|---|---|---|
| CN | 1705148 | 12/2005 |
| CN | 101560694 | 10/2009 |

(Continued)

OTHER PUBLICATIONS

Emmenegger, et al., "Carbon Nanotubes Synthesized on Metallic Substrates," Applied Surface Science, Aug. 1, 2000, pp. 452-456.

(Continued)

*Primary Examiner* — Kenneth Douyette
(74) *Attorney, Agent, or Firm* — Weaver Austin Villeneuve & Sampson LLP

(57) ABSTRACT

Provided are novel multidimensional electrode structures containing high capacity active materials for use in rechargeable electrochemical cells. These structures include main support structures and multiple nanowires attached to the support structures and extending into different directions away from these supports. The active material may be deposited as a layer (uniform or non-uniform) surrounding the nanowires and, in certain embodiments, the main supports and even substrate. The active material layer may be sufficiently thin to prevent pulverization of the layer at given operating conditions. Interconnections between the electrode structures and/or substrate may be provided by overlaps formed during deposition of the active layer. Silicide-based nano wires structures may be formed on the main supports in a fluidized bed reactor by suspending the metal-containing main supports in a silicon-containing process gas. A layer of silicon may be then deposited over these silicide nanowires.

30 Claims, 12 Drawing Sheets

(51) Int. Cl.

| | | |
|---|---|---|
| *B05D 5/12* | (2006.01) | |
| *H01M 4/38* | (2006.01) | |
| *H01M 4/134* | (2010.01) | |
| *H01M 4/1395* | (2010.01) | |
| *H01M 4/36* | (2006.01) | |
| *H01M 4/62* | (2006.01) | |
| *H01M 4/66* | (2006.01) | |
| *H01M 4/70* | (2006.01) | |
| *H01M 4/75* | (2006.01) | |
| *H01M 4/587* | (2010.01) | |
| *H01M 10/0525* | (2010.01) | |

(52) U.S. Cl.
CPC ............ *H01M 4/1395* (2013.01); *H01M 4/366* (2013.01); *H01M 4/622* (2013.01); *H01M 4/66* (2013.01); *H01M 4/661* (2013.01); *H01M 4/667* (2013.01); *H01M 4/70* (2013.01); *H01M 4/75* (2013.01); *H01M 4/587* (2013.01); *H01M 10/0525* (2013.01); *Y02E 60/122* (2013.01); *Y10T 29/49115* (2015.01)

(56) References Cited

U.S. PATENT DOCUMENTS

| | | | |
|---|---|---|---|
| 5,457,343 | A | 10/1995 | Ajayan |
| 5,997,832 | A | 12/1999 | Lieber |
| 6,083,644 | A | 7/2000 | Watanabe et al. |
| 6,090,505 | A * | 7/2000 | Shimamura et al. ....... 429/218.1 |
| 6,334,939 | B1 | 1/2002 | Zhou |
| 6,423,453 | B1 | 7/2002 | Noda |
| 6,514,395 | B2 | 2/2003 | Zhou |
| 6,667,099 | B1 | 12/2003 | Greiner et al. |
| 6,770,353 | B1 | 8/2004 | Mardilovich et al. |
| 7,189,476 | B1 | 3/2007 | Macklin et al. |
| 7,402,829 | B2 | 7/2008 | Green |
| 7,408,829 | B2 | 8/2008 | Kuang et al. |
| 7,682,750 | B2 | 3/2010 | Chen |
| 7,704,480 | B2 | 4/2010 | Jiang et al. |
| 7,816,031 | B2 | 10/2010 | Cui et al. |
| 8,017,272 | B2 | 9/2011 | Feng et al. |
| 8,241,372 | B2 | 8/2012 | Cheng et al. |
| 8,252,245 | B2 | 8/2012 | Tonkovich et al. |
| 8,257,866 | B2 | 9/2012 | Loveness et al. |
| 8,263,258 | B2 | 9/2012 | Nakazato et al. |
| 8,450,012 | B2 | 5/2013 | Cui et al. |
| 8,491,718 | B2 | 7/2013 | Chaudhari |
| 8,556,996 | B2 | 10/2013 | Loveness et al. |
| 8,877,374 | B2 | 11/2014 | Cui et al. |
| 2002/0028384 | A1 | 3/2002 | Krasnov et al. |
| 2002/0061441 | A1 | 5/2002 | Ogura et al. |
| 2002/0102461 | A1 | 8/2002 | Baker et al. |
| 2002/0148727 | A1 | 10/2002 | Zhou et al. |
| 2003/0175589 | A1 | 9/2003 | Kaminaka et al. |
| 2003/0178104 | A1 | 9/2003 | Sekine |
| 2003/0203139 | A1 | 10/2003 | Ren et al. |
| 2004/0126659 | A1 | 7/2004 | Graetz |
| 2005/0100793 | A1 | 5/2005 | Jonghe et al. |
| 2005/0153208 | A1 | 7/2005 | Konishiike et al. |
| 2005/0175901 | A1 | 8/2005 | Kawakami et al. |
| 2005/0238810 | A1 | 10/2005 | Scaringe et al. |
| 2005/0279274 | A1 | 12/2005 | Nui et al. |
| 2006/0035149 | A1 | 2/2006 | Nanba et al. |
| 2006/0040182 | A1 | 2/2006 | Kawakami et al. |
| 2006/0097691 | A1 | 5/2006 | Green |
| 2006/0154141 | A1 | 7/2006 | Salot et al. |
| 2006/0165988 | A1 | 7/2006 | Chinag et al. |
| 2006/0204853 | A1 | 9/2006 | Chen |
| 2006/0216603 | A1 | 9/2006 | Choi |
| 2006/0261134 | A1 | 11/2006 | Ho |
| 2007/0065720 | A1 | 3/2007 | Hasegawa et al. |
| 2007/0077433 | A1 | 4/2007 | Jeong et al. |
| 2007/0095276 | A1 | 5/2007 | Sunkara et al. |
| 2007/0148544 | A1 | 6/2007 | Le |
| 2007/0154808 | A1 | 7/2007 | Konishiike et al. |
| 2007/0190422 | A1 | 8/2007 | Morris |
| 2007/0264574 | A1 | 11/2007 | Kim et al. |
| 2008/0008844 | A1 | 1/2008 | Bettge et al. |
| 2008/0044732 | A1 | 2/2008 | Salot et al. |
| 2008/0145761 | A1 | 6/2008 | Petrat et al. |
| 2008/0145762 | A1 | 6/2008 | Adachi et al. |
| 2008/0213603 | A1 | 9/2008 | Kobayashi et al. |
| 2008/0261116 | A1 | 10/2008 | Burton et al. |
| 2008/0274403 | A1 | 11/2008 | Kim et al. |
| 2008/0280169 | A1 | 11/2008 | Niu et al. |
| 2008/0280207 | A1 | 11/2008 | Patoux et al. |
| 2009/0042102 | A1 | 2/2009 | Cui et al. |
| 2009/0061319 | A1 | 3/2009 | Kim et al. |
| 2009/0068553 | A1 | 3/2009 | Firsich et al. |
| 2009/0117472 | A1 | 5/2009 | Iwamoto |
| 2009/0169996 | A1 | 7/2009 | Zhamu et al. |
| 2009/0176159 | A1 | 7/2009 | Zhamu et al. |
| 2009/0186276 | A1 | 7/2009 | Zhamu et al. |
| 2009/0188544 | A1 | 7/2009 | Kobayashi et al. |
| 2009/0214942 | A1 | 8/2009 | Frank et al. |
| 2009/0214944 | A1 | 8/2009 | Rojeski |
| 2009/0246628 | A1 | 10/2009 | Adachi et al. |
| 2009/0269511 | A1 | 10/2009 | Zhamu et al. |
| 2009/0291371 | A1 | 11/2009 | Konishiike et al. |
| 2009/0305131 | A1 | 12/2009 | Kumar et al. |
| 2009/0305135 | A1 | 12/2009 | Shi et al. |
| 2009/0316335 | A1 | 12/2009 | Simon et al. |
| 2010/0043877 | A1 | 2/2010 | Wang et al. |
| 2010/0122725 | A1 | 5/2010 | Buchine et al. |
| 2010/0159337 | A1 | 6/2010 | Matsumoto et al. |
| 2010/0209775 | A1 | 8/2010 | Kim et al. |
| 2010/0237272 | A1 | 9/2010 | Chaudhari |
| 2010/0266897 | A1 | 10/2010 | Lee et al. |
| 2010/0285358 | A1 | 11/2010 | Cui et al. |
| 2010/0310941 | A1 | 12/2010 | Kumta et al. |
| 2010/0330419 | A1 | 12/2010 | Cui et al. |
| 2010/0330421 | A1 | 12/2010 | Cui et al. |
| 2010/0330423 | A1 | 12/2010 | Cui et al. |
| 2011/0111294 | A1 | 5/2011 | Lopez et al. |
| 2011/0111304 | A1 | 5/2011 | Cui et al. |
| 2011/0143019 | A1 | 6/2011 | Mosso et al. |
| 2011/0143263 | A1 | 6/2011 | Shirvanian |
| 2011/0159365 | A1 | 6/2011 | Loveness et al. |
| 2011/0159367 | A1 | 6/2011 | Kim et al. |
| 2011/0189510 | A1 | 8/2011 | Caracciolo et al. |
| 2011/0205688 | A1 | 8/2011 | Ray et al. |
| 2011/0229761 | A1 | 9/2011 | Cui et al. |
| 2011/0287318 | A1 | 11/2011 | Loveness et al. |
| 2012/0028123 | A1 | 2/2012 | Asari et al. |
| 2012/0070741 | A1 | 3/2012 | Liu et al. |
| 2012/0183856 | A1 | 7/2012 | Cui et al. |
| 2012/0301785 | A1 | 11/2012 | Buchine et al. |
| 2012/0301789 | A1 | 11/2012 | Loveness et al. |
| 2013/0004657 | A1 | 1/2013 | Xu et al. |
| 2013/0011736 | A1 | 1/2013 | Loveness et al. |
| 2013/0320582 | A1 | 12/2013 | Cui et al. |
| 2013/0344383 | A1 | 12/2013 | Loveness et al. |

FOREIGN PATENT DOCUMENTS

| | | |
|---|---|---|
| CN | 101953014 | 1/2011 |
| CN | 102460782 | 5/2012 |
| EP | 845828 | 10/2002 |
| EP | 1494302 | 1/2005 |
| EP | 2 427 928 | 3/2012 |
| FR | 2880198 | 6/2006 |
| GB | 2470056 | 11/2010 |
| JP | 2005-347076 | 12/2005 |
| JP | 2007/012310 | 1/2007 |
| JP | 2007-061945 | 3/2007 |
| JP | 2007-123100 | 5/2007 |
| JP | 2007-305569 | 11/2007 |
| JP | 2008-026595 | 2/2008 |
| JP | 2008-192594 | 8/2008 |
| JP | 2008-269827 | 11/2008 |
| JP | 2008-305781 | 12/2008 |
| JP | 2009-021226 | 1/2009 |
| JP | 2010-533945 | 10/2010 |

(56) References Cited

FOREIGN PATENT DOCUMENTS

| | | |
|---|---|---|
| JP | 2010-262752 | 11/2010 |
| JP | 2010-262754 | 11/2010 |
| KR | 10-2009-019339 | 2/2009 |
| WO | 2006/123049 | 11/2006 |
| WO | 2007/083152 | 1/2007 |
| WO | 2007/071778 | 6/2007 |
| WO | 2007/083155 | 2/2008 |
| WO | 2008/139157 | 11/2008 |
| WO | 2009/008558 | 1/2009 |
| WO | 2009/010757 | 1/2009 |
| WO | 2009/010758 | 1/2009 |
| WO | 2009/010759 | 1/2009 |
| WO | 2009/129490 | 10/2009 |
| WO | 2010/100599 | 9/2010 |
| WO | 2010/122910 | 10/2010 |
| WO | 2010/129910 | 11/2010 |
| WO | 2010/138617 | 12/2010 |
| WO | 2010/138619 | 12/2010 |
| WO | 2011/015174 | 2/2011 |
| WO | 2011/056847 | 5/2011 |
| WO | 2011/066818 | 6/2011 |
| WO | 2011/094642 | 8/2011 |
| WO | 2011/109477 | 9/2011 |
| WO | 2011/119614 | 9/2011 |
| WO | 2011/149958 | 12/2011 |
| WO | 2012/027360 | 3/2012 |
| WO | 2012/054767 | 4/2012 |

OTHER PUBLICATIONS

EP patent application No. 10781153.1, Supplemental Search Report and Written Opinion mailed Jul. 4, 2013.
Cheng, Mu, et al. "Silicon Nanotube Array/Gold Electrode for Direct Electrochemistry of Cytochrome C," *Journal of Physical Chemistry*, vol. 111, No. 6, Feb. 15, 2007, pp. 1491-1495.
U.S. Appl. No. 13/277,821, Office Action mailed Apr. 10, 2014.
Chan, Candace K. et al., "Structural and electrochemical study of the reaction of lithium with silicon nanowires," Journal of Power Sources 189 (2009) 34-39.
Chaudhari, P. et al., "Heteroepitaxial silicon film growth at 600 degree C for an Al—Si eutectic melt," Thin Solid Films 518 (2010) 5368-5371.
U.S. Appl. No. 13/427,681, Office Action mailed Oct. 2, 2013.
EP patent application No. 08831531.2, Supplemental European Search Report mailed Jul. 4, 2013.
JP patent application No. 2012-510025, Notice of Reasons for Rejection mailed Jan. 7, 2014.
Pre-Issuance Submission by Third Party dated Jan. 15, 2014, received in U.S. Appl. No. 13/914,491.
Pre-Issuance Submission by Third Party dated Jan. 21, 2014, received in U.S. Appl. No. 13/540,484.
U.S. Appl. No. 13/427,681, Office Action mailed May 21, 2014.
Aifantis et al., "High energy density lithium batteries", 2010 WILEY-VCH Verlag GmbH & Co. KGaA, Weinheim (Chapter 6: Next—generation anodes for secondary Li-Ion batteries) ISBN: 978-3-527-32407-1.
Kasavajjula et al., "Nano-and bulk-silicon-based insertion anodes for lithium-ion secondary cells", Journal of Power Sources 163 (2007) 1003-1039.
U.S. Appl. No. 12/437,529, Office Action mailed May 13, 2011.
U.S. Appl. No. 12/437,529, Office Action mailed Oct. 20, 2011.
U.S. Appl. No. 12/437,529, Office Action mailed Dec. 22, 2011.
Cui, Yi et al., "Doping and electrical transport in silicon nanowires", The Journal of Physical Chemistry, vol. 104, No. 22, Jun. 8, 2000.
WO patent application No. PCT/US2010/036235, International Search Report and Written Opinion mailed Jan. 28, 2001.
WO patent application No. PCT/US2011/026816, International Search Report and Written Opinion mailed Oct. 18, 2011.
WO patent application No. PCT/US2010/036237, International Search Report mailed May 26, 2010.
WO patent application No. PCT/US2010/036237, Written Opinion mailed May 27, 2011.
Cui, Li-Feng et al., "Crystalline-amorphous core-shell silicon nanowires for high capacity and high current battery electrodes," Nano Letters, 2009, vol. 9, No. 1 491-495, Dec. 23, 2008.
Kim, Cheol-Joo et al., "Spontaneous chemical vapor growth of NiSi nanowires and their metallic properties," Advanced Materials, 2007, 19, 3637-3642, Oct. 16, 2007.
Chan, Candace K. et al., "Surface chemistry and morphology of the solid electrolyte interphase on silicon nanowire lithium-ion battery anodes," Journal of Power Sources 189 (2009) 1132-1140.
Cui, Li-Feng et al., "Carbon-silicon core-shell nanowires as high capacity electrode for lithium ion batteries," Nano Letters, published on Aug. 5, 2009 on http://pubs.acs.org.
Esmanski, Alexei et al., "Silicon inverse-opal-based macroporous materials as negative electrodes for lithium ion batteries," Advanced Functional Materials, 2009, 1999-2010, May 7, 2009.
Park, Mi-Hee et al., "Silicon nanotube battery anodes," Nano Letters 2009, vol. 9, No. 11 3844 3847, Sep. 11, 2009.
Park, Mi-Hee et al., "Supporting information for silicon nanotube battery anodes," Sep. 11, 2009.
Kim, Hyunjung et al., "Three-dimensional porous silicon particles for use in high-performance lithium secondary batteries," Angewandte Chemie, Int. Ed. 2008, 47, 10151-10154, Nov. 17, 2008.
For high-performance anode material in lithium-ion batteries, After Gutenberg, downloaded from http://jcwinnie.biz/wordpress/?p=2864 on Dec. 25, 2009.
Magasinki, A. et al., "High-performance lithium-ion anodes using a hierarchical bottom-up approach," Nature Materials, published online at www.nature.com/naturematerials Mar. 14, 2010.
Kang, Kubum et al., "The role of NiOx overlayers on spontaneous growth of NiSix nanowires from Ni seed layers," Nano Letters 2008, vol. 8, No. 2 431-436, Jan. 12, 2008.
Kang, Kibum et al., Unconventional roles of metal catalysts in chemical-vapor syntheses of singel-crystalline nanowires,: Journal of Applied Physics 105, 122407 (2009).
Zhang, Hong-Li et al., "The facile synthesis of nickel silicide nanobelts and nanosheets and their application in electrochemical energy storage," Nanotechnology 19 (2008) 165606, (7 pp), Mar. 20, 2008.
Chan et al., "High-performance lithium battery anodes using silicon nanowires," Nature Nanotechnology, vol. 3, Jan. 2008.
WO patent application No. PCT/US2010/034106, International Search Report and Written Opinion mailed Feb. 7, 2011.
U.S. Appl. No. 11/837,291, Office Action mailed Feb. 18, 2009.
U.S. Appl. No. 11/837,291, Office Action mailed Oct. 26, 2009.
U.S. Appl. No. 11/837,291, Office Action mailed Jan. 7, 2010.
U.S. Appl. No. 11/837,291, Office Action mailed Apr. 22, 2010.
U.S. Appl. No. 11/837,291, Notice of Allowance mailed Aug. 10, 2010.
U.S. Appl. No. 12/895,424, Office Action mailed Nov. 17, 2010.
Ying et al., "Characterization of Sn02 nanowires as anode materials for Li-ion batteries." Applied Physics Letters 87(11), 2005 (Abstract only).
Sharma et al., "Structural characteristics and connection mechanism of gold-catalyzed bridging silicon nanowires," Journal of Crystal Growth 280 (2005) 562-568.
Levitt, "Whisker Technology." Wiley Interscience, 1970.
Li et al., "Rate capabilities of nanostructured LiMn2O4 electrodes in aqueous electrolyte." J. Electrochem. Soc. 147, 2044-2049 (2000).
Sharma et al., "Thermodynamic properties of the lithium-silicon system." Journal of the Electrochemical Society 123, 1763-1768 (Dec. 1976).
Givargizov, "Fundamental aspects of VLS growth," Journal of Crystal Growth 31, 20-30 (1975).
Goldstein et al., "Melting in semiconductor nanocrystals," Science 256, 1425-1427 (Jun. 1992).
Li et al., "A high capacity nano-Si composite anode material for lithium rechargeable batteries," Electrochemical and Solid-State Letters, 2 (11) 547-549 (1999).
Uehara et al., "Thick vacuum deposited silicon films suitable for the anode of Li-ion battery," Journal of Power Sources 146, 441-444 (2005).

(56) References Cited

OTHER PUBLICATIONS

Westwater et al., "Growth of silicon nanowires via gold/silane vapor-liquid-solid reaction," Journal Va. Sci. Technology B 15(3), 554-557 (May/Jun. 1997).

Yazawa et al., "Effect of one monolayer of surface gold atoms on the epitaxial growth of InAs nanowhiskers," Appl. Phys. Lett. 61 (17), 2051-2053 (Oct. 1992).

EP patent application No. 08831531.2, European Search Report mailed Oct. 27, 2010.

Li et al., "Freestanding mesoporous quasi-single-crystalline Co3O4 nanowire arrays," J. Am. Chem. Soc. 2006, 128, 14258-14259, Oct. 18, 2006.

Sharma et al., "Diameter control of Ti-catalyzed silicon nanowires," Journal of Crystal Growth 267 (2004) 613-618, Apr. 20, 2004.

Pan et al., Nanobelts of Semiconduction Oxides, *Science* Mar. 9, 2001: 1947-1949.

Huang et al., Catalytic Growth of Zinc Oxide Nanowires by Vapor Transport, Adv. Mater., 13, 113-116 (2001).

Morales, et al., A Laser Ablation Method for the Synthesis of Crystalline Semiconductor Nanowires, Science vol. 279, Jan. 9, 1998.

Dick, et al A New Understanding of Au-Assisted Growth of I11-V Semiconductor Nanowires, Adv. Funct. Mater. 15, 1603-1610 (2005).

Chan, C.K., et al., High-Performance Lithium Battery Anodes Using Silicon Nanowires, Nature, vol. 3, Jan. 2008.

Chan, C.K., et al., "High Capacity Li Lon Battery Anodes Using Ge Nanowires", Nano Letters, 2008, vol. 8, No. 1, 307-309.

Che, G., et al., "Carbon Nanotubule Membranes for Electrochemical Energy Storage and Production". Nature 393, 346-349 (1998).

Park, M.S. et al., "Preparation and Electrochemical Properties of SnO2 Nanowires for Application in Lithium-ion Batteries" Angew. Chem. Int. Edn 46, 750-753 (2007).

Huggins, R.A. & Nix, W.D. Decrepitation Model for Capacity Loss During Cycling of Alloys in Rechargeable Electrochemical Systems, Ionics 6, 57-63 (2000).

Lee, Y.M., et al. SEI layer formation on amorphous Si thin electrode during precycling. J. Electrochem. Soc. 154, A515-A519 (2007).

Green, M., et al Structured silicon anodes for lithium battery applications. Electrochem. Solid State Lett. 6, A75-A79 (2003).

Ryu, J.H., et al Failure modes of silicon powder negative electrode in lithium secondary batteries. Electrochem. Solid-State Lett. 7, A306-A309 (2004).

Gao, et al., "Alloy formation in nanostructured silicon." Adv. Mater. 13, 816-819 (2001).

Wang, Y., et al. Epitaxial growth of silicon nanowires using an aluminum catalyst. Nature Naotech. 1, 186-189 (2006).

Wu, Y. et al. Controlled growth and structures of molecular-scale silicon nanowires. Nao Lett. 4, 433-436 (2004).

Zhou, Controlled Li Doping of Si Nanowires (Applied Physics Letters vol. 75, No. 16), Oct. 18, 1999.

Carbon nanofiber product sheet, Applied Science 2008, downloaded from http://www.apsci.com/ngm-pyrol.html on May 2011.

U.S. Appl. No. 13/427,681, "Electrode including nanostructures for rechargeable cells," Cui et al., filed Mar. 22, 2012.

WO patent application No. PCT/US2011/037767, International Search Report and Written Opinion mailed Jan. 16, 2012.

WO patent application No. PCT/US2011/057159, International Search Report and Written Opinion mailed Jun. 11, 2012.

Zhang, et al., "Pyrolytic Carbon-coated Silicon/Carbon Nanotube Composites: Promising Application for Li-ion Batteries," *Int. J. Nanomanufacturing*, vol. 2, Nos. 1/2, 2008, pp. 4-15.

Office Action mailed Apr. 5, 2012 for U.S. Appl. No. 13/039,031.

Notice of allowance mailed Jul. 26, 2012 for U.S. Appl. No. 13/039,031.

"Sweet nanotech batteries: Nanotechnology could solve lithium battery charging problems," PhysOrg.com, Received online Mar. 23, 2012 from http://phys.org/news127043619.html.

Lee et al., "Anomalous growth and characterization of carbon-coated nickel silicide nanowires," Chemical Physics Letters 384, 2004, pp. 215-218.

U.S. Appl. No. 13/564,324, titled Template Electrode Structures for Depositing Action Materials, filed Aug. 1, 2012.

U.S. Appl. No. 13/540,484, "Template Electrode Structures with Enhanced Adhesion Characteristics," Liu et al., filed Jul. 2, 2012.

U.S. Office Action mailed Sep. 17, 2012 issued in U.S. Appl. No. 13/540,484.

Quasi-2D structures Make Better Batteries, Tyrell, James, Apr. 17, 2008, pp. 1-2.

Nickel Silicide Nanobelts and Sheets in Li-ion Anodes Capacity, Green Car Congress, Apr. 19, 2009, pp. 1-3.

U.S. Office Action mailed Oct. 25, 2012 issued in U.S. Appl. No. 13/427,681.

Campbell et al., "Prepartion of mesoporous silica templated metal nanowire films on foamed nickel substrates," Microporous and Mesoporous Materials 97, 2006, 114-121.

TW patent publication No. 201238125, published Sep. 16, 2012, English Abstract.

U.S. Appl. No. 13/540,484, Notice of Allowance mailed Feb. 22, 2013.

U.S. Appl. No. 13/914,491, "Template electrode structures for depositing active materials," filed Jun. 10, 2013, Loveness et al.

U.S. Appl. No. 13/277,821, Office Action mailed Feb. 25, 2013.

U.S. Appl. No. 13/427,681, Office Action mailed Jun. 11, 2013.

Marczak et al., "The individual core/shell silicon nanowire structure probed by Raman spectroscopy," Phys. Status Solidi C 6, No. 9, 2053-2055 (2009).

WO patent application No. PCT/US2012/045313, International Search Report and Written Opinion mailed Jan. 21, 2013.

WO patent application No. PCT/US2011/029440, International Search Report and Written Opinion mailed Nov. 29, 2011.

U.S. Appl. No. 12/787,138, Office Action mailed Apr. 26, 2012.

Ma et al., "Nest-like silicon nanospheres for high-capacity lithium storage," Advanced Materials, 2007, 19, 4067-4070.

U.S. Appl. No. 12/787,138, Final Office Action mailed Oct. 11, 2012.

S.K. Samudrala and S. Bandyopadhyay: Hybrid Nanocomposite for Nanotechnology, 2009, p. 245.

U.S. Appl. No. 12/787,138, Notice of Allowance mailed Jan. 28, 2013.

U.S. Appl. No. 13/069,212, Office Action mailed Apr. 15, 2013.

U.S. Appl. No. 13/891,035, "Interconnected hollow nanostructures containing high capacity active materials for use in rechargeable batteries," Cui et al., filed May 9, 2013.

JP patent application No. 2012-556203, Office Action mailed Aug. 26, 2014.

CN patent application No. 201180019460.3, Office Action mailed Jul. 2, 2014.

JP patent application No. 2012-510025, Decision of Rejection mailed Aug. 5, 2014.

CN patent application No. 201080026302.6, Office Action mailed Aug. 8, 2014.

JP patent application No. 2013-501400, Decision of Rejection mailed Aug. 19, 2014.

CN patent application No. 201180022062.7, Office Action mailed Aug. 25, 2014.

CN patent application No. 201080026302.6, Office Action mailed Oct. 23, 2013.

U.S. Appl. No. 13/914,491, Office Action mailed Dec. 3, 2014.

U.S. Appl. No. 13/069,212, Final Office Action mailed Aug. 7, 2013.

U.S. Appl. No. 13/277,821, Office Action mailed Oct. 11, 2013.

JP patent application No. 2012-513226, Japanese Office Action mailed Feb. 4, 2014.

CN patent application No. 201080023257.9, Chinese Office Action mailed Dec. 12, 2013.

U.S. Appl. No. 13/069,212, Final Office Action mailed Jul. 18, 2014.

U.S. Appl. No. 13/891,035, Final Office Action mailed Jun. 19, 2014.

CN patent application No. 201080023257.9, Second Office Action mailed Oct. 21, 2014.

U.S. Appl. No. 13/277,821, Final Office Action mailed Nov. 20, 2014.

U.S. Appl. No. 13/427,681, Office Action mailed Feb. 6, 2015.

(56) References Cited

OTHER PUBLICATIONS

EP Search Report issued in Application No. 12807729.4 on Feb. 5, 2015.
CN patent application No. 201080026302.6, Office Action mailed Mar. 23, 2015.
TW patent application No. 100120247, Office Action mailed Feb. 9, 2015.
JP patent application No. 2012-513226, Japanese Office Action mailed Feb. 10, 2015.
U.S. Appl. No. 13/069,212, Final Office Action mailed Feb. 25, 2015.
EP patent application No. 11760076.7, Extended Search Report dated Mar. 9, 2015.
TW patent application No. 100120433 Office Action dated Feb. 9, 2015.

* cited by examiner

US 9,172,088 B2

MULTIDIMENSIONAL ELECTROCHEMICALLY ACTIVE STRUCTURES FOR BATTERY ELECTRODES

CROSS-REFERENCE TO RELATED APPLICATIONS

This application claims the benefit of U.S. Provisional Application No. 61/347,614, entitled "MULTIDIMENSIONAL ELECTROCHEMICALLY ACTIVE STRUCTURES FOR BATTERY ELECTRODES," filed May 24, 2010, which is incorporated herein by reference in its entirety for all purposes. This application is also a Continuation-in-Part application of U.S. patent application Ser. No. 13/039,031, entitled "TEMPLATE ELECTRODE STRUCTURES FOR DEPOSITING ACTIVE MATERIALS," filed on Mar. 2, 2011, now U.S. Pat. No. 8,257,866, which is incorporated herein by reference in its entirety for all purposes.

STATEMENT OF GOVERNMENT SUPPORT

The invention described and claimed herein was made with United States Government support under NIST ATP Award No. 70NANB10H006, awarded by the National Institute of Standards and Technology. The United States Government has certain rights in this invention.

BACKGROUND

High capacity electrochemically active materials are very desirable for battery applications. However, these materials exhibit substantial volume changes during battery cycling, such as swelling during lithiation and contracting during delithiation. For example, silicon swells as much as 400% during lithiation to its theoretical capacity of about 4200 mAh/g or $Li_{4.4}Si$ structure. Volume changes of this magnitude cause pulverization of active materials structures, losses of electrical connections, and capacity fading.

Providing high capacity materials as nanostructures can address some of these issues. Small dimensions of nanostructures cause less overall dimensional changes, which may be less mechanically destructive. However, integrating nanostructures into commercially-scaled battery electrodes layers has been challenging difficult. For example, nanofilms deposited on conventional flat substrates, such as metal foils, generally do not provide adequate loading. Furthermore, many processes proposed for fabricating nanostructures are slow and often involve expensive materials. For example, etching silicon nanowires from bulk particles requires silver catalysts and expensive etching solution. Growing long crystalline silicon structures can also be a relative slow process and may involve expensive catalysts, such as gold.

SUMMARY

Provided are novel multidimensional electrode structures containing high capacity active materials for use in rechargeable electrochemical cells. These structures include main support structures and multiple nanowires attached to the support structures and extending into different directions away from these supports. The active material may be deposited as a layer (uniform or non-uniform) surrounding the nanowires and, in certain embodiments, the main supports and even substrate. The active material layer may be sufficiently thin to prevent pulverization of the layer at given operating conditions. Interconnections between the electrode structures and/or substrate may be provided by overlaps formed during deposition of the active layer. Silicide-based nanowires structures may be formed on the main supports in a fluidized bed reactor by suspending the metal-containing main supports in a silicon-containing process gas. A layer of silicon may be then deposited over these silicide nanowires.

In certain embodiments, a battery electrode structure for use in a battery includes a conductive substrate and a plurality of multidimensional electrochemically active structures attached to and in electronic communication with the conductive substrate. Each multidimensional electrochemically active structure includes a support having a metal (e.g., a metal containing material) and nanowires having support-rooted ends attached to the support and free-ends extending into different directions away from the support. The nanowires include metal silicide of the metal. The battery electrode structure also includes a layer coating the nanowires. This layer includes an electrochemically active material for inserting and releasing electrochemically active ions during cycling of the battery.

The metal silicide of the nanowires may be one or more of the following silicides: nickel silicide, cobalt silicide, copper silicide, silver silicide, chromium silicide, titanium silicide, aluminum silicide, zinc silicide, and iron silicide. Some more specific examples include $Ni_2Si$, $NiSi$, $Ni_3Si_2$, and/or $NiSi_2$. Examples of the electrochemically active material includes crystalline silicon, amorphous silicon, a silicon oxide, a silicon oxy-nitride, a tin containing material, a germanium containing material, and a carbon containing material. In certain embodiments, nanowires are between about 1 micrometer and 200 micrometers in length on average. In the same or other embodiments, nanowires are less than about 100 nanometers in diameter on average. The layer of the electrochemically active material may be at least about 100 nanometers in thickness on average. In certain embodiments, a volume ratio of the electrochemically active material to the metal silicide is at least about 5. Prior to cycling of the battery, the electrochemically active material may be doped with one or more materials selected from the group consisting of: phosphorous, boron, gallium, and lithium. In certain embodiments, a battery electrode structure also includes a shell formed over the layer of the electrochemically active material. The shell may include carbon, copper, fluorine, a polymer, a sulfide, lithium phosphorous oxynitride (LIPON), a lithium salt, and/or a metal oxide.

In certain embodiments, a battery electrode structure includes a substrate layer formed over a conductive substrate and including an electrochemically active material. The substrate layer forms joint structures with the layer coating the nanowires, and these joint structures provide attachment to some multidimensional electrochemically active structures to the conductive substrate and electronic communication of these structures with the conductive substrate. In the same or other embodiments, portions of the layer of the electrochemical active materials coating the nanowires form joint structures with each other.

In certain embodiments, a battery electrode structure also includes a polymeric binder attaching the plurality of multidimensional electrochemically active structures to the conductive substrate. A battery electrode structure may be used in a lithium ion battery. In certain embodiments, the electrochemically active material has a theoretical lithiation capacity of at least about 500 mAh/g or, more specifically, at least about 800 mAh/g or even at least about 1000 mAh/g.

In certain embodiments, a battery electrode structure includes a nanostructure template having template nanowires rooted to the substrate. A layer of the electrochemically active material coats these template nanowires as well as nanowires of the multidimensional electrochemically active structures. The template nanowires provide attachment and electronic communication to the multidimensional electrochemically active structures with respect to the conductive substrate.

In certain embodiments, a layer of the electrochemically active material is at least twice as thick at the free-ends of the nanowires than at the support-rooted ends. In the same or other embodiments, a layer of the electrochemically active material includes amorphous silicon and germanium such that there is more silicon and less germanium at the free-ends of the nanowires than at the support-rooted ends. A battery electrode structure may also include an intermediate sub-layer positioned between the nanowires and the layer of the electrochemically active material and configured to improve metallurgical attachment and electronic conductivity between the nanowires and the layer of the electrochemically active material. In certain embodiments, this intermediate sub-layer includes one or more metals, various oxides, and/or sulfides. The same or different intermediate sub-layer may be positioned between the nanowires and the layer of the electrochemically active material and configured to provide an elastic interface between the nanowires and the layer of the electrochemically active material. In the same or other embodiments, a battery electrode structure may also include a base layer adjacent to the substrate. The base support structure may be substantially free of metal that is a part of the metal silicide of the nanowires.

In certain embodiments, a conductive substrate includes one or more of the following materials: copper, nickel, titanium, and stainless steel. In the same or other embodiment, a battery electrode structure is a part of a negative electrode. In other embodiments, a battery electrode structure is a part of a positive electrode.

Provided also a lithium ion cell including a conductive substrate and a plurality of multidimensional electrochemically active structures attached to and in electronic communication with the conductive substrate. Each multidimensional electrochemically active structure may include a support having metal or metal containing materials, nanowires having support-rooted ends attached to the support and free-ends extending into different directions away from the support, and a layer coating the nanowires. In certain embodiments, multidimensional electrochemically active structure may include multiple carbon nanotubes attached to a support. Carbon nanotubes may be used instead of or in addition to silicide-containing nanowires. The layer includes an electrochemically active material for inserting and releasing electrochemically active ions during cycling of the lithium ion cell. The nanowires include metal silicide of the metal.

A method of fabricating multidimensional electrochemically active structures is also provided. In certain embodiments, the method involves receiving supports comprising metal, forming nanowires comprising support-rooted ends attached to the supports and free-ends extending into different directions away from the supports, and forming a layer coating the nanowires. The nanowires include metal silicide of the metal. The layer includes an electrochemically active material for inserting and releasing electrochemically active ions during cycling of the electrochemically active material.

The method may also involve, prior to forming the nanowires, treating the supports using one or more of the following techniques: oxidation, annealing, reduction, roughening, sputtering, etching, electroplating, reverse-electroplating, chemical vapor deposition, nitride formation, and deposition of an intermediate layer. In certain embodiments, supports have one or more of the following shapes: particles, rods, and flakes. Forming nanowires may involve flowing a process gas containing a silicon precursor through a fluidized bed reactor and suspending the supports in the process gas for a predetermined period of time. Forming an electrochemically active material layer may involve flowing a process gas containing a silicon precursor over intermediate structures including the support and nanowires whiles these intermediate structures are suspended in the process gas (i.e., floating in the reactor) or positioned on a conductive substrate.

These and other embodiments are described further below with reference to the figures.

DETAILED DESCRIPTION OF EXAMPLE EMBODIMENTS

Figure 1A:
FIG. 1A is an Scanning Electron Microscope (SEM) image of an intermediate structure that includes nickel silicides nanowires attached to supports prior to coating the intermediate structure with an electrochemically active material layer.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

To minimize fracture and pulverization of the active material structures during battery cycling, high capacity electrochemically active materials may be formed into nanostructures. However, providing adequate amounts of active materials in the nanostructure-form may be challenging. It is difficult to mechanically arrange, support, and electrically interconnect multiple nanostructures in comparison to a fewer larger structures that carry the same amounts of active material. Furthermore, it may be difficult to preserve these initial arrangements and interconnections over a large number of battery cycles that involve swelling-contraction of the nanostructures.

For example, nanoparticles that are only 0.05-0.10 micrometers in diameter have to rely on many inter-particle electrical connections and, in certain embodiments, additives structures to pass an electrical current to the substrate. To provide some reference, a typical commercially-feasible electrode has layers that are between about 20-200 micrometers in thickness on each side of the substrate. In such electrodes, initial connections formed between nanostructures during electrode fabrication (e.g., slurry coating) are quickly lost during battery cycling when the nanoparticles start swelling and contracting repeatedly. Specifically, the nanoparticles swell during lithiation and push other adjacent nanoparticles (and/or other components, such as conductive additives) away to allow more space for the swollen nanoparticles. Then, the nanoparticles shrink during delithiation/discharging. The adjacent nanoparticles and/or other components may not follow the nanoparticles and gaps may be formed between within the electrode. As a result, many initial connections may be lost leading to electrically "unconnected" nanoparticles that later are not involved in lithiation and effectively become "inactive."

Another example of nanostructures is nanofilms, which are typically about 0.05 micrometers to 1 micrometer thick. This limited thickness helps to avoid pulverization during cycling. However, when films are deposited on typical flat surface substrates, such as foils, these films fail to provide adequate amounts of active materials to reach commercially feasible capacity of the cell. Prototype cells built with nanofilms are generally not practical for most battery applications.

It has been found that certain high surface area templates can be used to provide larger surfaces for depositing active materials as nanofilms. In certain embodiments, a relatively flat metallic substrate, such as a foil, is processed to form silicide nanostructures extending from the substrate surface and forming a template. These silicides nanostructures may be shaped as nanowires having substrate rooted ends (or middle portions) that form integral structures with the substrate surface. Yet, metal silicide structures may be difficult to grow above certain dimensions. Without being restricted to any particular theory, it is believed that the length of silicide nanowires may be limited by diffusion rates of silicon (typically supplied from a gas phase) and metal (typically supplied by metal substrate) in the respective silicide phases. Resulting templates have limited thickness corresponding to the length of nanowires, which may be less than about 10-20 micrometers for nickel silicide nanowires. Even this surface area formed by the silicide nanowires, which is much larger than that of the metal foil substrate, may be insufficient for providing sufficient amounts of high capacity active materials. For example, it has been estimated that an electrode fabricated with a high capacity material that can provide about 1000 mAh/g needs to be at least 40-60 micrometers thick (not accounting the substrate) to achieve commercially feasible capacities of 3500 mAh per each square centimeter of the electrode area.

It has been also found that template structures may be formed from separate metal particles as opposed to continuous metal substrates, such as foils. Exposing effectively all sides of the metal particles to reactive gases allows forming multidimensional structures. These metal particles are often referred to as main supports or, simply, supports of the multidimensional structures. For example, metal-containing supports may be exposed to a silicon-containing precursor to form nanowires having support-rooted ends attached to the supports and free-ends extending into different directions away from the supports. The nanowires are made of metal silicide of the metal and remain attached to the supports and extend into different directions away from the supports forming "fuzzy ball"/"urchin" like structures. These intermediate (or partially fabricated) structures may have diameters that twice as large as thicknesses of nanostructured silicide template layers as described above simply because the nanowires are grown in all directions instead of just one. Furthermore, intermediate structures (or final structures with an active material deposited) may be formed into an electrode having any thickness simply by depositing additional structures on the top of each other until a desired thickness is achieved. These novel "fuzzy ball" structures may be also added over a single-layer nanowire template structure described above.

FIG. 1A is an scanning electron microscope (SEM) image of intermediate structures containing nickel silicides nanowires attached to nickel supports (not visible) before coating these structures with an active materials layer. Each of these two "fuzzy ball" structures has a diameter of about 20 micrometers. Distribution and orientation of the nanowires extending in all directions form a good template for coating with an electrochemically active material. Furthermore, intermediate structures being independent objects allow being stacked up to achieve various electrode thicknesses and avoid limitations associated with silicide formations.

Figure 1B:
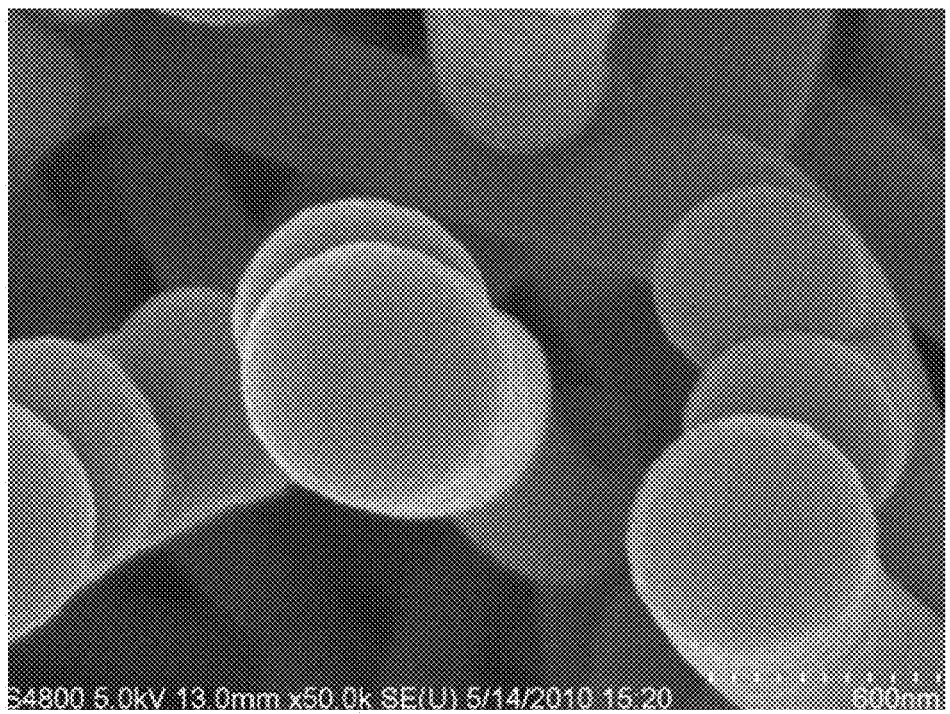
FIG. 1B is an SEM image of a portion of the multidimensional electrochemically active structure after coating nickel silicide nanowires with amorphous silicon.

A layer of the electrochemically active material layer is then formed on the surface of these intermediate structures to form the multidimensional electrochemically active structures (or fully fabricated structures). These fully fabricated structures may also look like "fuzzy ball"/"urchin" structures but have substantially thicker extensions, e.g., silicide nanowires shown in FIG. 1A are now coated with a relatively thick layer of the active material layer. For example, silicide nanowires that are only 10-50 nanometers in diameter may be coated with an active material layer that is at least about 100 nanometers thick and, in certain embodiments, even at least about 1 micrometer thick. This results in "fuzzy balls" having brunches that are at least about 2 micrometers in diameter. FIG. 1B is an SEM image of multidimensional electrochemically active structures, which include nickel silicide intermediate structures (not visible) coated with a layer of amorphous silicon.

Figure 1C:
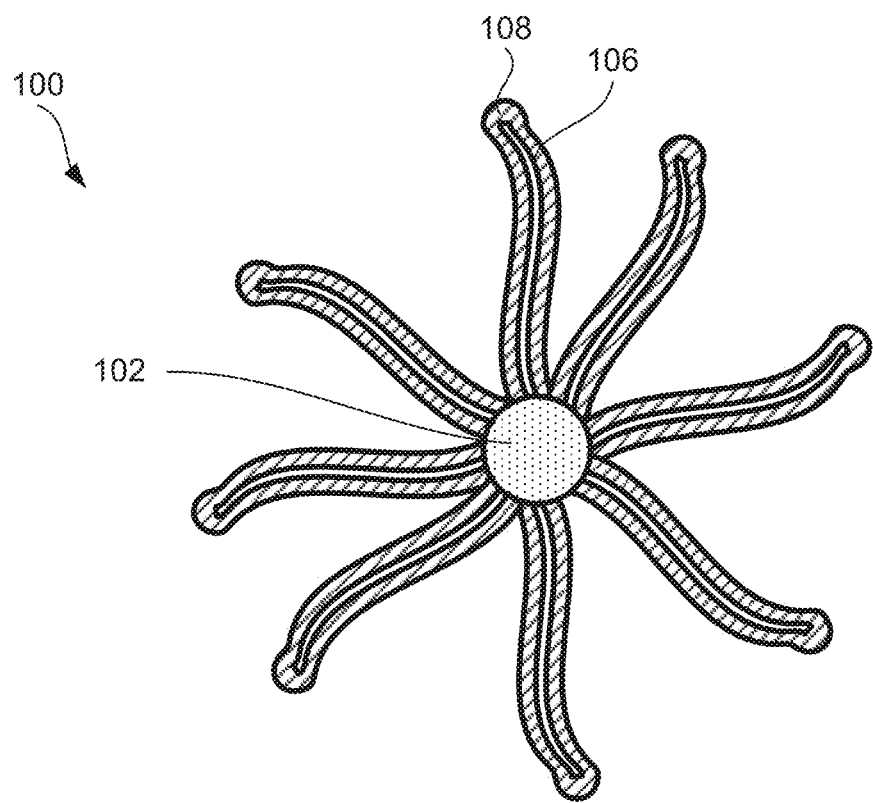
FIG. 1C is a schematic two-dimensional (2D) representation of a multidimensional electrochemically active structure, in accordance with certain embodiments.

Features of multidimensional electrochemically active structures may be easier to assess from schematic representations that allow demonstrating all main components of the structures. Specifically, FIG. 1C is a schematic two-dimensional (2D) representation of a multidimensional electrochemically active structure 100, in accordance with certain embodiments. Multidimensional electrochemically active structure 100 includes a support structure 102, which may be a nanoparticle, nanowires, or any other type of nanostructures. Support structure 102 may include one or more metals that are used as a metal source during formation of nanowires 106. Various examples of metals and other features of support structure 102 are further described below. Nanowires 106 are grown from support structure 102 and remain attached to support structure 102 during later processing and use in the battery. Nanowires are defined as structures that have an aspect ratio of greater than one, typically at least about 2 and more frequently at least about four. Nanowires 106 extend into different directions (e.g., all three dimensions) away from support 102. Nanowires 106 are coated with an active material, which forms an active material layer 108. In certain embodiments, density of nanowires 106 near support 102 prevent active materials layer 108 from coating support 102. Keeping the active material area away from support 102 may help to preserve connection between nanowires 106 and support 102. Multidimensional electrochemically active structure 100 shown in FIG. 1C is then arranged into a battery electrode together with other such structures to achieve any desirable thickness.

Structure and Composition

Figure 2A:
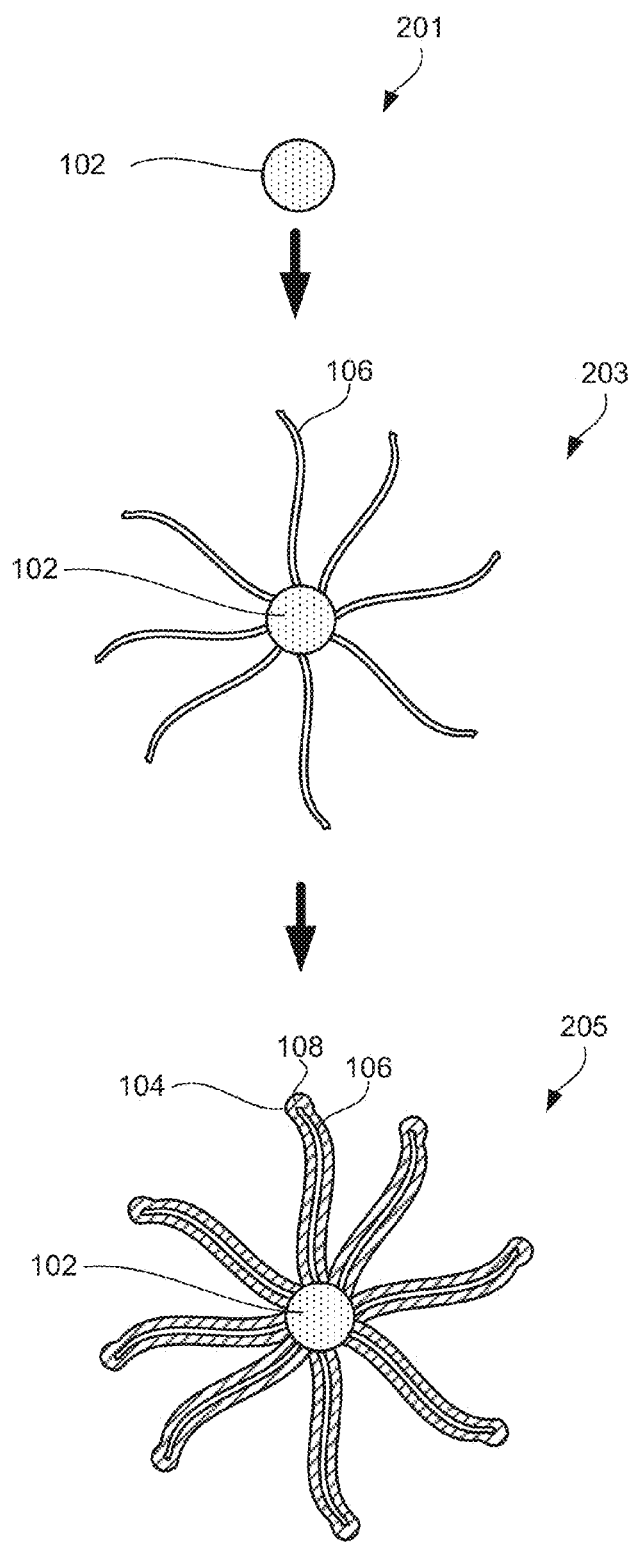
FIG. 2A is a schematic representation of a multidimensional electrochemically active structure during different stages of its fabrication, in accordance with certain embodiments.

Additional features of multidimensional electrochemically active structures may be better understood from a process of making these structures. FIG. 2A is a schematic representation of a multidimensional electrochemically active structure during different stages of its fabrication, in accordance with certain embodiments. In an initial stage 201, a support structure 102 is provided. Support 102 includes one or more metals used to form silicide structures in a later stage. Generally, support 102 should be distinguished from electrode substrates, such as metal foils, which are used for mechanical support and electronic conductivity of the overall electrode. However, in certain embodiments, a support structure may be a part of or integrated into the electrode substrate. For example, a support structure may be a particle supported by a mesh substrate or may be a strand of that substrate.

Support 102 is typically, though not necessarily, metallic. It may serve multiple roles, such as supporting nanowires 106 extending therefrom and providing metal used for growing silicide nanowires 106. In some embodiments, the same material (i.e., metal) serves both support and "metal source" roles. In other embodiments, multiple materials are combined in the same support structure and serve separate roles. For example, the base or support material can be non-metal. In other embodiments, the base material is metal or some other conductive material but it is not consumed during formation of silicide nanowires 106. Examples of base materials include copper, copper coated with metal oxides, stainless steel, titanium, aluminum, nickel, chromium, tungsten, metal nitrides, metal carbides, carbon, carbon fiber, graphite, graphene, carbon mesh, porous metallic meshes, porous silica, conductive polymers, or combinations of above including multi-layer structures. Another material in such composite support structures is a source metal, which is at least partially consumed during formation of silicide nanowire 106. Examples of metal containing source materials include nickel, cobalt, copper, silver, chromium, titanium, iron, zinc, aluminum, tin, and various combinations thereof. Examples of some alloys include nickel/phosphorus, nickel/tungsten, nickel/chromium, nickel/cobalt, nickel/iron, and nickel/molybdenum. In certain embodiments, a source material forms an outer sub-layer over the base material structure. Such layer may be at least about 10 nm thick or, more specifically, at least about 50 nm, or between about 10 nanometers and 50 micrometers. For example, a 20-nanometer thick nickel sub-layer deposited over a copper support may be sufficient to produce a dense mat of nickel silicide nanowires that are 20-200 micrometers long. In certain embodiments, a source material is substantially consumed during template growth to maximize volume available for an active material (i.e., to maximize the active material volume fraction in order to maximize the energy density of the electrode). The consumption of the source material will not sacrifice the strength and conductivity of the template structures. For example, copper particles may be coated with a layer of nickel and used to form nickel silicide nanowires extending from the copper supports. In another example, sub-micron porous silica particles or flakes may be coated with nickel, which is then used to grow silicide nanowires on the silica supports. In other embodiments, a source material is the same as the base material. In other words, initial support structures may include only one kind of material. The source material may be partially or substantially consumed during formation of template structures. When the source material is only partially consumed, the remaining material acts as a support structure in the operating electrode. When the source material is substantially/fully consumed, the silicide or other types of template structures may form joined structures at their bases and remain connected to other template structures forming a "fuzzy-ball" like structure. These joined structures may be also referred to as support structures even though their composition is different from the initially introduced structures that are consumed during formation of template structures.

In other embodiments, a support does not include a base material and is made entirely from a metal containing source material. Some examples of such materials are presented above. Support 102 may also include various materials that enhance adhesion of silicide nanowires 106 to support 102 and/or, in certain embodiments, to protect support 102 during further processing and/or cycling of the resulting electrochemical cell. These additional materials are referred herein as sub-layers although other structural arrangements of these materials are possible as well.

For example, various intermediate sub-layers may be provided in between the base material and the metal source. In certain embodiments, a sub-layer containing copper and/or nickel may be deposited between the base and metal source sub-layers to improve metallurgical and electronic connections of the later-formed template to the base support structure. In a specific embodiment, a base support structure containing a conductive material (e.g., stainless steel) is coated with a thin sub-layer of copper followed by a thicker sub-layer of nickel (e.g., between about 10 nanometers and 3 micrometers). The nickel sub-layer is then used to form a nickel silicide template, while the copper sub-layer acts as an adhesion and conductive intermediary.

In certain embodiments, a thin sub-layer of a masking material is formed using a PVD or some other deposition technique. A thickness of this sub-layer may be between about 1 Angstroms and 15 Angstroms. It has been found that certain materials at such thicknesses do not form a continuous layer but instead form a collection of small separated islands or clumps. Specifically, masking materials may be deposited as small islands and used for masking the underlying support from depositing a metal containing sub-layer in these areas. Alternatively or in addition to, masking materials may be deposited on top of a metal containing sub-layer to mask template growth.

A substrate may contain other materials that may be used to enhance the adhesion of subsequently formed silicide nanostructures to the base support structure, to protect the base support structure during processing and cell cycling, to promote nucleation of the template structures, to prevent deposition of the active materials at (or near) the substrate interface, to act as an additional source of silicon during silicide formation, and other functions. Some examples and details of intermediate sub-layers are provided in U.S. Provisional Patent Application 61/260,297 to DelHagen et al., entitled "INTERMEDIATE LAYERS FOR ELECTRODE FABRICATION" filed on Nov. 11, 2009, which is incorporated herein by reference in its entirety for purposes of describing intermediate sub-layers. Still other materials and sub-layer can be provided as a part of substrate. For example, a metal containing sub-layer may have a metal oxide sub-layer or a protective sub-layer.

Returning to FIG. 1C, support 102 may be in the form of low aspect ratio particles, such as structures having an aspect ratio of less than about 4, or less than 2, or around 1. In other embodiments, support 102 may be in the form of high aspect ratio wires or rods, such as structure with an aspect ratio greater than about 4 or even greater than about 10. Other types of structures for support 102 include wires, tubes, flakes, and other shapes. In certain embodiments, the support has an overall dimension of between about 100 nanometers and 10 micrometers or, more particularly between about 0.5 micrometers and 5 micrometers, or around 1-2 micrometers.

In a next stage 203 of FIG. 2A, support 102 is shown with silicide nanowires 106. Other types of silicide nanostructures may be formed from the support as well. In the depicted embodiment, silicide nanowires 106 have support-rooted ends attached to support 102 and free ends extending into different directions away from support 102. Silicide nanowires 106 may between about 5 nanometers and 100 nanometers in diameter (i.e., prior to depositing the active material) or, more specifically, between about 10 nanometers and 50 nanometers. Further, the nanowires may be between about 1 micrometer and 100 micrometers long or, more specifically, between about 2 micrometers and 25 micrometers long.

Silicide nanowires 106 may have a variable material composition along their length of the nanowires, i.e., between their support-rooted ends and free ends. Specifically, it has been found that silicide nanowires generally have a higher metal concentration near the support-rooted ends since more metal is available at that end during formation of the nanowires. The metal concentration near the free-ends is less because the metal has to diffuse along the nanowires to reach these ends. This phenomenon is also believed to be at least partially influenced by higher availability of silicon near the free-ends than closer to the support. This variability of metal and silicon concentrations may reflect in different morphological and stoichiometric phases of silicides. For example, nickel silicide nanowires may include one, two, or all three phases of nickel silicide, i.e., $Ni_2Si$, $NiSi$, and $NiSi_2$. It is believed that higher nickel content phases form stronger bonds with nickel metal. Therefore, this variability may strengthen nickel silicide nanowires adhesion to nickel supports (or nickel coated supports) and reduce the contact resistance.

In addition various metal silicides, nanowires or, more generally, nanostructures attached to supports may be fabricated from other materials, such as carbon (e.g., fullerene type nanostructures), germanium, and others. For example, single-walled carbon nanotubes (CNTs) or multi-walled CNTs may be used. CNTs provide sufficient electrical conductivity and surface area for depositing active materials over their surfaces. The resulting electrode structures may be cycled such that CNTs contribute to the overall capacity (i.e., CNTs are lithiated and de-lithiated) or may remain substantially inert. CNTs may be formed on support structures in a manner similar to silicide nanowires described elsewhere in this document. For example, nickel, iron, or cobalt containing materials may be used as catalysts for CNT growth. Various carbon-containing precursors, such as $CH_4$, $C_4H_2$, and alcohols, may be flown into a processing chamber while the forming structures are maintained at a temperature of between about 50° C. and 900° C. Such "fuzzy-ball" CNT-based structures may be formed on metal particles, wires, and films. Other types of nanowires, fibers and columnar structures, such as zinc oxide nanowires, may be used as well. Some of these template structures may be formed by repeated dendritic electroplating.

Figure 2B:
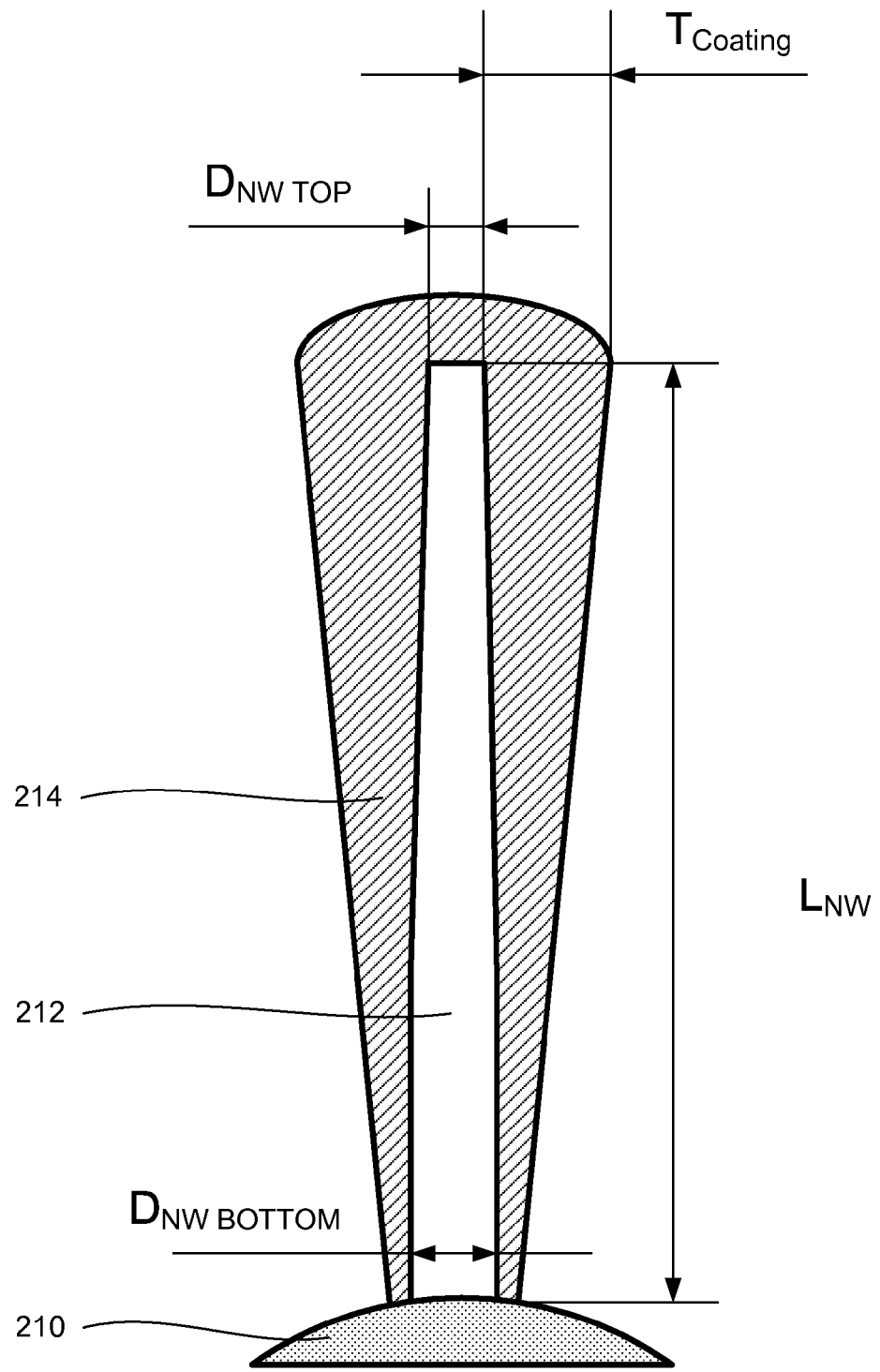
FIG. 2B is a schematic representation of one nanowire attached to the support and coated with an electrochemically active material layer that exemplifies variations in the layer's, in accordance with certain embodiments.

Metal diffusion limitations may also cause nanowires to be cone shaped as schematically shown in FIG. 2B. Specifically, silicide nanowires may have slightly wider support-rooted ends than the free ends. In certain embodiments, an average diameter near the support-rooted ends ($D_{NW\,BOTTOM}$ as shown in FIG. 2B) is at least about twice of that near the free ends ($D_{NW\,TOP}$ as shown in FIG. 2B). In more specific embodiments, a ratio of $D_{NW\,BOTTOM}$ to $D_{NW\,TOP}$ is at least about 4 or, more particularly, at least about 10. Wider support-rooted ends help to maintain attachment of the nanowires to support. Substrate-rooted ends may be large enough to touch each other and cover the entire surface of the support and prevent formation of the active material layer on the support. This feature may also help strengthening an interface between the nanowires and support.

Returning to FIG. 2A, silicide nanowires 106 form a high surface area intermediate structure/template, which is later used for coating with an active material layer 108 as shown in a stage 205. The structure shown at this stage may be the final structure used to form a better electrode and may be referred to as a multidimensional electrochemically active structure. Each nanowire with a portion of the active layer may be referred to as a branch of this multidimensional structure. Silicide nanowires 106 provide mechanical support to active material layer 108 and/or electrical communication to support 102 and other nanowires. Some silicide nanowires of one structure may have direct contact with silicide nanowires of other multidimensional structures and/or with conductive substrate. In the same or other embodiments, similar contacts are provided by the active material layer formed around silicide nanowires. Overall, multidimensional electrochemically active structures may form an interconnected network of the structures in the battery electrode.

In certain embodiments, a thickness of the active material layer 108 is at least about 10 nanometers or, more particularly, at least about 100 nanometers or even at least about 1 micrometer. Generally, this thickness does not exceed a fracture threshold specific to the active material used. This threshold may be adjusted by varying the composition of the active material, morphological structure (e.g., amorphous v. crystalline), and certain other physical characteristics (e.g., porosity). Furthermore, the threshold depends on cycling conditions of the battery. It has been found that multidimensional electrochemically active structure may be fabricated having a porous layer of amorphous silicon that is thicker than 1 micrometer without sacrificing cycling performance.

Examples of electrochemically active materials include silicon containing materials (e.g., crystalline silicon, amorphous silicon, other silicides, silicon oxides, sub-oxides, oxynitrides), tin containing materials (e.g., tin, tin oxide), germanium, carbon containing materials, a variety of metal hydrides (e.g., $MgH_2$), silicides, phosphides, and nitrides. Other examples include: carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, and tin doped with carbon). Examples of positive electrochemically active materials include various lithium metal oxides (e.g., $LiCoO_2$, $LiFePO_4$, $LiMnO_2$, $LiNiO_2$, $LiMn_2O_4$, $LiCoPO_4$, $LiNi_{1/3}CO_{1/3}Mn_{1/3}O_2$, $LiNi_xCO_YAl_ZO2$, $LiFe_2(SO4)_3$, $Li_2FeSiO_4$, $Na_2FeO_4$), carbon fluoride, metal fluorides such as iron fluoride ($FeF_3$), metal oxide, sulfur, and combinations thereof. Doped and non-stoichiometric variations of these positive and negative active materials may be used as well. Examples of dopants include elements from the groups III and V of the periodic table (e.g., boron, aluminum, gallium, indium, thallium, phosphorous, arsenic, antimony, and bismuth) as well as other appropriate dopants (e.g., sulfur and selenium). In certain embodiments, a high capacity active material includes amorphous silicon. For example, a layer of amorphous silicon may be deposited over a nickel silicide template.

Furthermore, various techniques have been proposed to protect the electrical connection between nanowires and supports. In one class of techniques, the branches of the multidimensional electrochemically active structures have "top heavy" shapes in which a support-rooted ends are relatively thinner (consider both the nanowires and the active material layer) than the free ends. For example, free ends may have substantially more active material than the support-rooted ends. In another class of techniques, the spacing of the nanowires is controlled such that the individual wires are relatively evenly spaced on the surface of the support. In specific embodiments, a mechanism is employed to prevent the template nanowires from bunching near to one another near their support-rooted at their attachment regions. In yet another class, certain "passivation" techniques and/or materials are employed to minimize mechanical distortions and stresses at the support interface that are generally caused by swelling and contraction of the active materials.

Some examples of top heavy shapes include shapes that have gradually and continuously increased cross-sectional dimensions (e.g., diameter) from the substrate rooted ends to the free ends (similar to the ones shown in FIG. 2B). In other embodiments, the cross-sectional dimensions may increase gradually but not continuously. Other examples include shapes that increase their cross-sectional dimensions abruptly but continuously. Furthermore, other examples include shapes that increase their cross-sectional dimensions abruptly and not continuously. The overall shape profile may be driven by the thickness of the active material layer, cross-sectional dimensions of the template structures, or a combination of these two parameters. For example, a template structure may have a wider base than free end, while a distribution of the active material coating may be such that the overall electrode structure has a wider free end than the base.

FIG. 2B is a schematic representation of a nanowire 212 attached to support 210 and coated with an electrochemically active material layer 214 that exemplifies variations in the layer's, in accordance with certain embodiments. Active material layer 214 is substantially thicker near the free end of this brunch than near support 210. Without being restricted to any particular theory, it is believed that such distribution of the active material can be achieved by certain process conditions resulting in a mass transport limiting regime. This regime results in a concentration gradient of the active material precursor species (e.g., silane) along the length of nanowire 212 ($L_{NW}$ as identified in FIG. 2B) and higher deposition rates near the free ends of the branch than near support 210.

Such active material distribution may be beneficial from an electrochemical cycling perspective because the support-rooted ends of the structures will experience less swelling and stress during lithiation, thereby preserving contact between nanowire 212 and support 210.

In certain embodiments, uneven distribution of the active material may be achieved by performing CVD deposition at relative high pressure levels inside the deposition chamber. Without being restricted to any particular theory, it is believed that a shorter mean free path is achieved at higher pressure levels, which, in turn, leads to high faster deposition rates and rapid consumption of the active material precursors near the free ends of the structures. This effectively creates a mass transport limiting regime over the height of the template. For example, deposition may be performed at between about 50 Torr and 760 Torr, more specifically at between about 100 Torr and 600 Torr or, even more specifically, between about 200 Torr and 600 Torr. In a particular example, deposition is performed at about 600 Torr. Deposition temperatures may be between about 400° C. and 600° C. or, more specifically, between about 450° C. and 550° C. In a particular example, deposition is performed at about 500° C. These temperature ranges are presented for a thermal CVD technique. If a PECVD technique is used for deposition, the temperatures may be in the range of between about 200° C. and 450° C. Silane concentration in argon or hydrogen may range between about 0.5% and 20% or, more specifically, between about 0.5% and 10% or, even more specifically, between about 1% and 5%. Other silicon-containing precursors, such as di-silane, may be used as well.

In certain embodiments, an intermediate sub-layer is deposited over a formed intermediate silicide structure but before deposition of the electrochemically active material. This sub-layer is positioned at the template-active material interface. This intermediate sub-layer may include titanium, copper, iron, nickel, nickel titanium, chromium, oxides (e.g., $SiO_2$, $TiO_2$, $Al_2O_3$), nitrides (e.g., TiN, WN, $Si_3N_3$) or other similar materials. Materials may be deposited using electroplating, sputtering, or evaporation techniques. Without being restricted to any particular theory, it is believed that a presence of an intermediate sub-layer at this interface increases metallurgical alloying with the active material and better adhesion. Further, some of these materials may act as adhesion promoters and oxygen getters. Finally, alloys like nickel titanium, copper-zinc-aluminum-nickel, and copper-aluminum-nickel may be used for their elastic properties to provide an interface between a relative dynamic active material layer (which swells and contracts during cycling) and relative static template layer.

Battery Electrode Structures

Figure 3A:
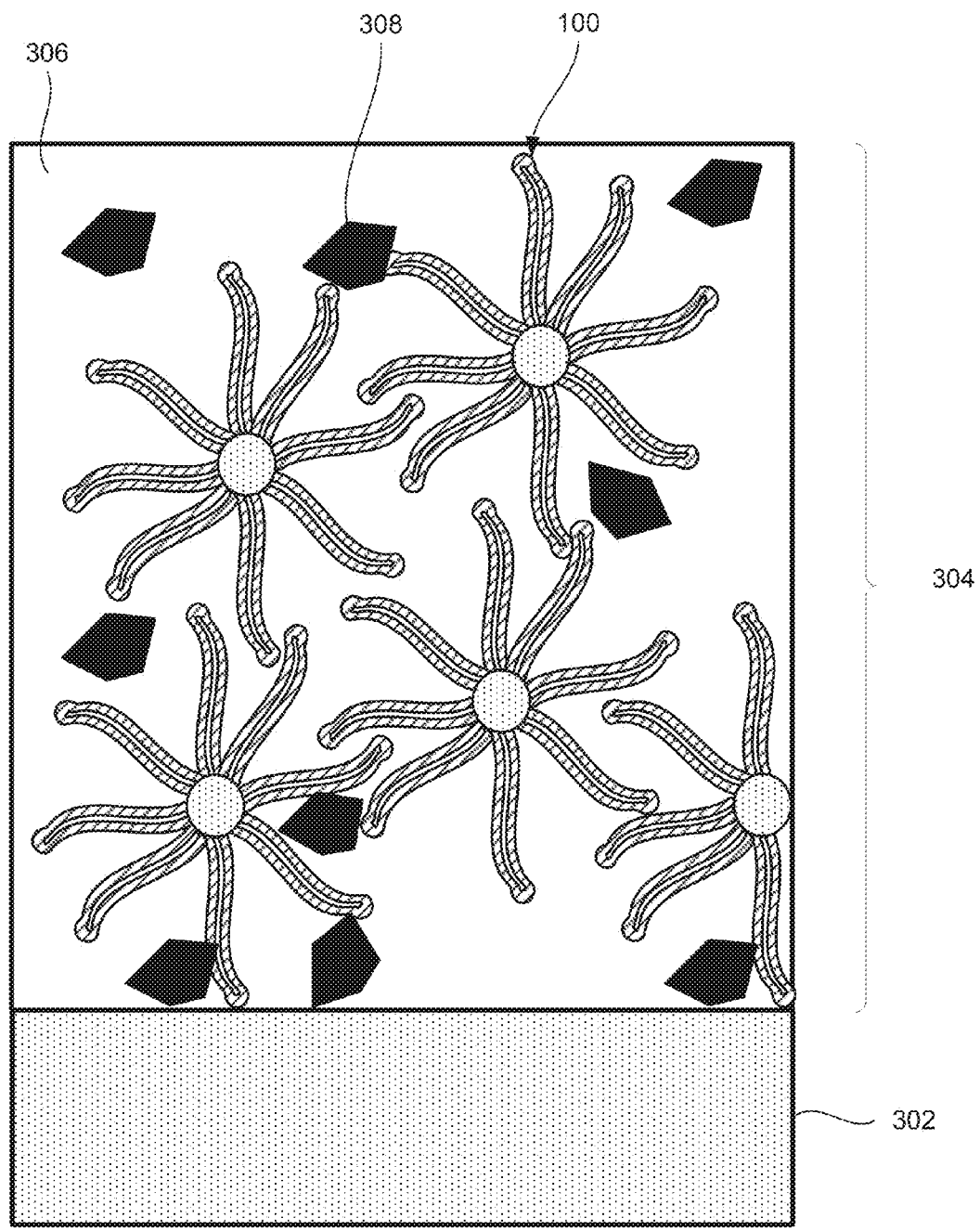
FIG. 3A illustrates an example of a battery electrode structure having multidimensional electrochemically active structures bound and electrically connected to the substrate using a polymeric binder, in accordance with certain embodiments.
Figure 3B:
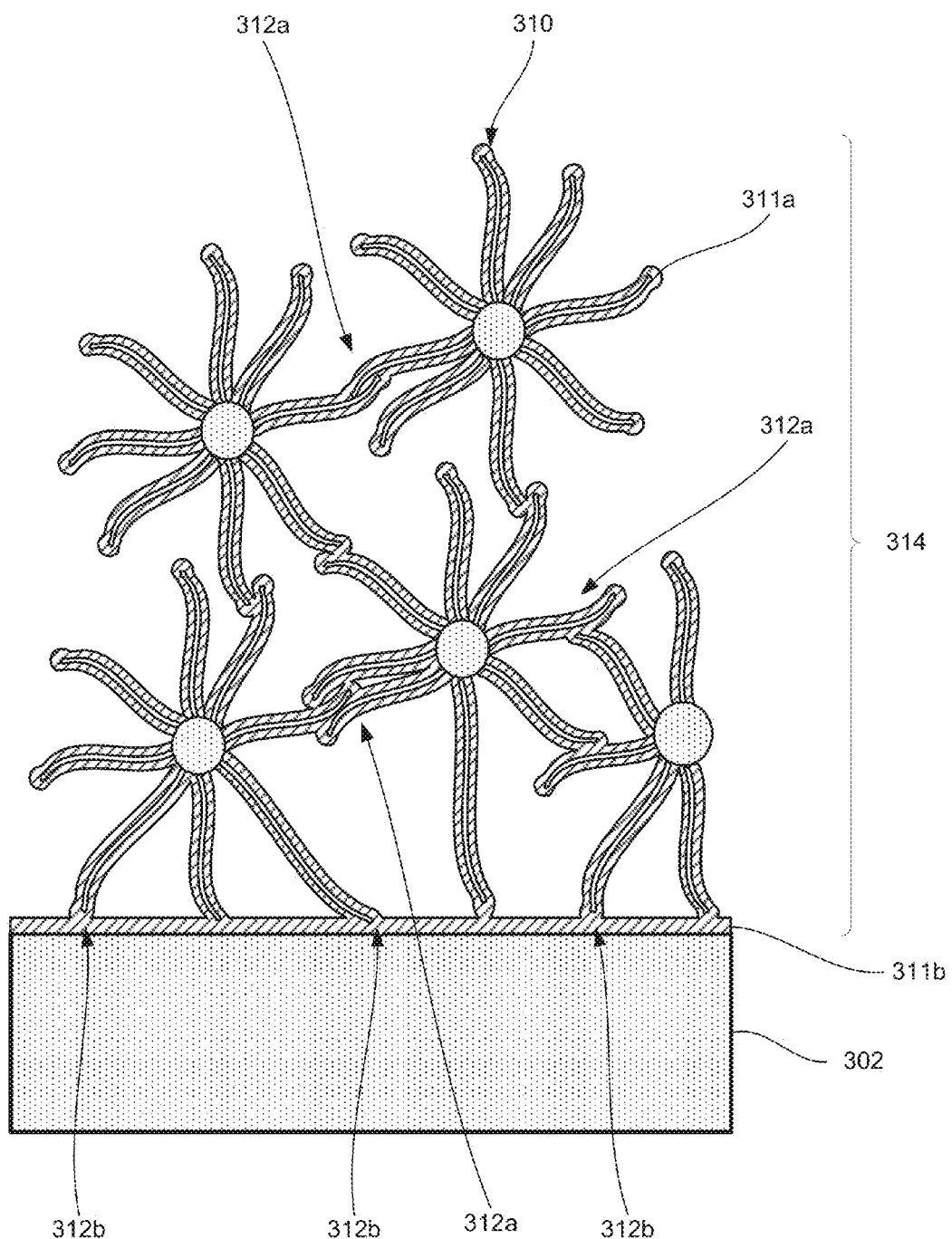
FIG. 3B illustrates another example of a battery electrode structure having multidimensional electrochemically active structures bound to and electrically connected to the substrate through joint structures formed by overlapping of the active material layer portions, in accordance with certain embodiments.

FIGS. 3A and 3B illustrate two examples of battery electrode structures or, simply battery electrodes, that include multidimensional electrochemically active structures. As mentioned above, multidimensional structures can be arranged in a multi-layered fashioned to fabricate battery electrodes having any thicknesses. For example, an electrode may have a single-layered arrangement of the multidimensional structures, in which case the electrode thickness generally corresponds to the overall dimension of the multidimensional structures. In certain embodiments, supports of the multidimensional structures may be positioned right on the substrate prior to forming nanowires, in which case nanowires extend only above the substrate surface resulting in an electrode thickness that is about a half of that in the previous example. On the other hand, multidimensional structures may be arranged in multiple layers above the substrate surface, and the electrode thickness may be substantially greater than the overall dimension of the multidimensional structures, e.g., between about 2-5 times greater. Multidimensional structures could be fabricated with relatively small diameters that do not need to correspond to maximum growth limits of the silicide nanowires. This feature together with an ability of making multilayered electrode structures present much greater flexibility in electrode design. For example, high capacity applications may require thicker electrode layers, while high cycling rate (high charge and/or discharge currents) applications may need thinner more conductive battery electrode structures.

FIG. 3A illustrates an example of an electrode structure 304 that includes multidimensional electrochemically active structures 100 bound to substrate 302 using a polymeric binder 306, in accordance with certain embodiments. A similar electrode structure (not shown) may be provided on the other side of substrate 302. Electrode structure 304 may be deposited on substrate 302 using a number of deposition techniques, such as doctor blading, slurry coating, pasting, and the like. A substrate may be a thin foil having a thickness of between about 5 micrometers and 50 micrometers or, more particularly, between about 10 micrometers and 30 micrometers. In other embodiments, a substrate layer is a mesh, perforated sheet, foam, porous material and the like. Examples of substrate materials include copper and/or copper dendrites, coated and un-coated metal oxides, stainless steel, titanium, aluminum, nickel, chromium, tungsten, metal nitrides, metal carbides, carbon, carbon fiber, graphite, graphene, carbon mesh, conductive polymers, or combinations of above including multi-layer structures. In certain embodiments, a substrate may have functional and/or protective layers, e.g., a catalyst layer, diffusion barrier layer, and/or adhesion layer. Various examples of such layers are described in U.S. Provisional Patent Application No. 61/260,297, entitled "Intermediate Layers for Electrode Fabrication," filed on Nov. 11, 2009, which is incorporated herein by reference, as well as in this detailed description further below.

In certain embodiments, electrode structure 304 includes a conductive additive 308 to increase conductivity of overall structure 304. This conductivity depends on electrical interconnections among multidimensional structures 100, which may be direct or through conductive additives. Another conductivity consideration is between multidimensional structures 100 and substrate 302. Examples of conductive additives include various carbonaceous materials, such as coke, acetylene black, carbon black, Ketjen black, channel black, furnace black, lamp black and thermal black or carbon fibers. Other examples include metallic flakes or particles of copper, stainless steel, nickel or other relatively inert metals, conductive metal oxides, such as titanium oxides or ruthenium oxides, or electronically-conductive polymers, such as polyaniline or polypyrrole. A weight loading of conductive additive may be up to 20 weight percent of the electrode layer, more specifically 1 to 10 weight percent. In particular embodiments, the conductive additive is a carbon black having a mean particle size of between 1 μm and 70 μm, more specifically between about 5 μm and 30 μm, is used in an amount of between about 1 and 5 weight percent of the total electrode layer.

A binder 306 is used to hold multidimensional structures 100 and conductive additive 308 (if one is used) on substrate 302. Generally, a binder may be used in the amount of between about 2 and 25 weight percent of the electrode layer based on the solid content of the binder (i.e., excluding solvent). Binders may be soluble in aqueous or non-aqueous solvents, which are used during fabrication to adjust viscosity of the binder and, for example, viscosity of the slurry. Some examples of "non-aqueous binders" include poly(tetrafluoroethylene) (PTFE), poly(vinylidene fluoride) (PVDF), styrene-butadiene copolymer (SBR), acrylonitrile-butadiene copolymer (NBR) or carboxymethyl cellulose (CMC), polyacrylic, and polyethylene oxide, and combinations thereof. For example, 10-20 weight percent PVDF dissolved in N-methyl-2-pyrrolidinone (NMP) may be used. As another example, a combination binder using 1-10 weight percent of polytetrafluoroethylene (PTFE) and 1-15 weight percent of carboxymethylcellulose (CMC) may be used relative to the total weight of the materials in the electrode layer.

Examples of "aqueous binders" include carboxymethyl cellulose and poly (acrylic acid), and/or acrylonitrile-butadiene copolymer latex. One specific example of an aqueous binder is polyacrylamide in combination with at least one of the following copolymers: carboxylated styrene-butadiene copolymer and styrene-acrylate copolymer. The ratio of polyacrylamide to such copolymer may be between about 0.2:1 to about 1:1 on a dry weight basis. In another specific example, the aqueous binder may comprise a carboxylic acid ester monomer and a methacrylonitrile monomer.

In other specific examples, binder 306 may include a fluoropolymer and a metal chelate compound. The fluoropolymer may be polymerized from fluorinated monomers, such as vinyl fluoride (VF), vinylidene fluoride (VdF), tetrafluoroethylene (TFE), trifluoroethylene (TrFE), chlorotrifluoroethylene (CTFE), fluorinated vinyl ethers, fluorinated alkyl acrylates/methacrylates, perfluoroolefins having 3-10 carbon atoms, perfluoro C1-C8 alkyl ethylenes and fluorinated dioxoles. The metal chelate compound may be in the form of a heterocyclic ring with an electron-pair-acceptor metal ion, such as titanium and zirconium ions, attached by coordinate bonds to at least two electron-pair-donor nonmetal ions, such as N, O, and S.

FIG. 3B illustrates another example of an electrode structure 314 that includes multidimensional electrochemically active structures 310 bound to and electrically connected to substrate 302 through joint structures 312a and 312b, in accordance to certain embodiments. Joint structures 312a and 312b are formed by overlaps and/or physical contacts formed by active material layers 311a and 311b. This type of electrode structures may be formed by a variety of methods. In certain embodiments, intermediate silicide structures (i.e., cores with attached nanowires) are placed onto the substrate surface and in close proximity to each other. An active material layer is then formed on a surface of these intermediate structures and substrate. Once the layer thicknesses on these surfaces, some portions of the layer will overlap because some of these surfaces are in close proximity to each other and even contact each other. These overlaps are referred to as joint structures 312a and 312b in the resulting electrode structure 314. Some examples of interconnecting techniques and structures are described in U.S. Provisional Patent Application No. 61/316,104, entitled "INTERCONNECTING ACTIVE MATERIAL NANOSTRUCTURES," filed on Mar. 22, 2010, which is incorporated herein by reference.

Process

Figure 4A:
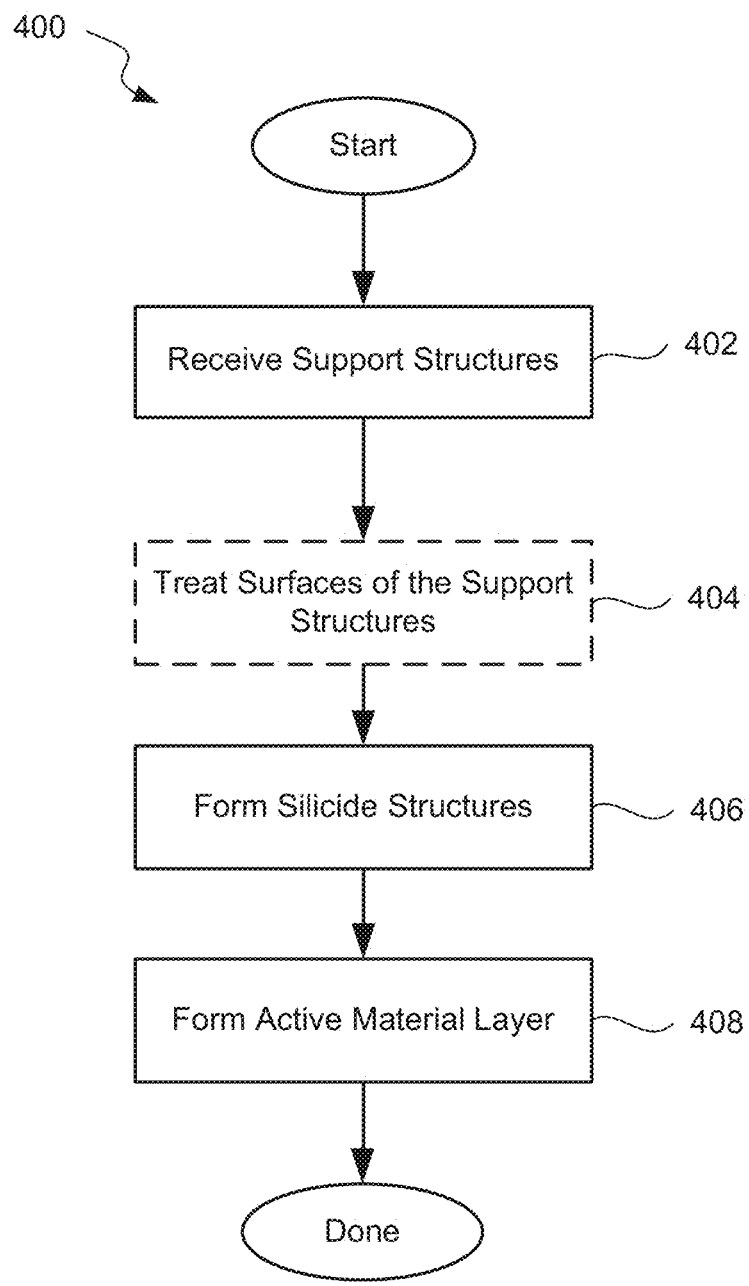
FIG. 4A illustrates a process flowchart corresponding to a method of fabricating a battery electrode structure including multidimensional electrochemically active structures, in accordance with certain embodiments.

FIG. 4A is a flowchart illustrating an example of a process for fabricating an electrode layer containing multidimensional electrochemically active structures in accordance with certain embodiments. The process 400 may start with receiving multiple support structures (block 402). Various examples of supports are provided above. Supports may be fed into a reaction chamber, such as a fluidized bed reactor or a fluidized bath configured to suspend the supports in a gas flow for a predetermined period of time. Flow rates are determined based on size, shapes, and weight densities of the supports, viscosity, and other characteristics of the gas, dimensions of the chamber, desired residence time, and other process parameters. It should be also noted that an electromagnetic field, mechanical mixing, and other techniques could be used to suspend the support structures in the gas stream. Further, it should be noted that process conditions used to suspend processed structures (e.g., supports, intermediate structures, resulting structures) in the reactor may be adjusted based on changing shapes and weights of these structures. The reaction chamber may be configured to perform chemical vapor deposition (CVD) apparatus (e.g., thermal CVD or Plasma Enhanced CVD) and/or other deposition techniques.

The process 400 may continue with an optional treatment of the supports' surfaces (block 404). The surfaces may be treated to increase their roughness, change their compositions, and other characteristics that would, for example, enhance formation of silicide nanowires on these surfaces. Examples of treatment techniques include introducing silicide precursors into the surfaces (e.g., silicon, metal, and/or catalyst containing materials), chemically modifying the surfaces (e.g., forming oxides, nitrides, carbides, initial silicide structures, and treatments with various oxidizing and reducing agents), and physically modifying the surfaces (e.g., increasing surface roughness with laser ablation and/or plasma treatment). Other examples include changing grain orientation, annealing, sonication, doping, and ion implantation.

In certain embodiments, metal support structures are oxidized at a temperature of between about 150° C. and 500° C. (more specifically around 300° C.) while suspended for between about 0.1 and 10 min (more specifically around 1 min) in a gas stream containing oxygen or other suitable oxidant. It has been found that some oxidation helps formation of nickel silicide structures by, for example, roughening the supports' surfaces. Rough oxide edges may serve as nucleation sites during silicide formation. Further, the oxide may act as a mask to allow nucleation only at the pores. Another function of an oxide may be to regulate the diffusion rate of the metal to the reaction site. It has been also found that excessive oxidation may be detrimental to silicide formation. As such, oxidation conditions may be optimized for each metal containing material and structures containing these materials.

The process 400 may proceed with formation of silicide nanostructures (block 406), which may be also performed in a fluidized bed CVD reactor described above. A process gas that includes a silicon containing precursor (e.g., silane) is flown into the chamber at a flow rate that suspends the supports in the deposition zone for a predetermined time. In certain embodiments, the volumetric concentration of silane in the process gas is less than about 10%, or more specifically less than about 5%, or even less than about 1%. In particular embodiments, the concentration of silane is about 1%. A process gas may also include one or more carrier gases, such as argon, nitrogen, helium, hydrogen, oxygen (although typically not with silane), carbon dioxide, and methane. The gas may be maintained at a temperature of between about 350° C. and 500° C. or, more specifically, between about 425° C. and 475° C. The duration of deposition may be between about 1 minute and 30 minutes or, more specifically between about 5 minutes and 15 minutes. In embodiments employing non-silicide nanostructures, appropriate adjustments to the gas phase precursor and other process conditions may be employed.

In certain embodiments, process conditions may vary during the same silicide formation operation. For example, silane may be introduced initially at a relatively high concentration in order to promote nucleation of silicide nanostructures. The silane concentration may be then reduced (e.g., towards the end of the silicide deposition operation) when further nanowire growth is limited by metal diffusion from the rooted ends of the nanowires towards the growing tips. Further, the gas temperature may be kept low initially and then increased in order to promote such metal diffusion. Overall, process conditions may be varied to control physical (e.g., length, diameter, shape, orientation) and morphological (e.g., stoichiometric phases to ensure high conductivity of the silicide, for example, distribution along the length, crystalline/amorphous) properties of the deposited nanowires. Other process conditions to be considered are a composition of the gas mixture, flow rates, flow patterns, a chamber pressure, a substrate temperature, and electric field characteristics. In certain embodiments, process conditions (e.g., temperature, pressure, and silane concentration) are adjusted to promote sidewall deposition of amorphous silicon or deposition of silicon particles onto the silicide structures once they have nucleated. Conditions that should be changed may include process temperature, pressure, and silane concentration.

The process 400 continues with formation of an active material layer over the metal silicide nanowires (block 408), which may also be done in a fluidized bed reactor using a CVD techniques. Other deposition techniques include, depending on the type of active layer, physical vapor deposition, electroplating, electroless plating, or solution deposition.

In certain embodiments, active materials may be deposited using a PECVD technique, which will now be described in more detail with reference to deposition of an amorphous silicon layer doped with phosphorous. However, it should be understood that this technique could be also used for deposition of other materials. Intermediate silicide nanostructures/templates, or more specifically nickel silicides nanowires in the context of this example, are provided into a reactor. A process gas is heated to between about 200° C. and 400° C. or, more specifically, between about 250° C. and 350° C. The gas can include a silicon containing precursor (e.g., silane) and one or more carrier gases (e.g., argon, nitrogen, helium, hydrogen, carbon dioxide, and methane). In a specific example, a concentration of silane in helium is between about 5% and 20%, or more specifically between about 8% and 15%. The gas may also include a dopant containing material, such as phosphine. The gas is introduced into a chamber at a flow rate sufficient to suspend the intermediate structures for a predetermined period of time. The RF power may be delivered at between about 10 W and 1000 W, which generally depends on the size of the chamber and other factors.

Other operations not reflected in the process flowchart 400 may include interconnecting and/or attaching multidimensional electrochemically active structures to the substrate. Various examples of these operations are presented in U.S. Provisional Patent Application No. 61/316,104, entitled "INTERCONNECTING ACTIVE MATERIAL NANOSTRUCTURES" filed on Mar. 22, 2010, which is incorporated herein by reference in its entirety for all purposes.

Apparatus

Figure 4B:
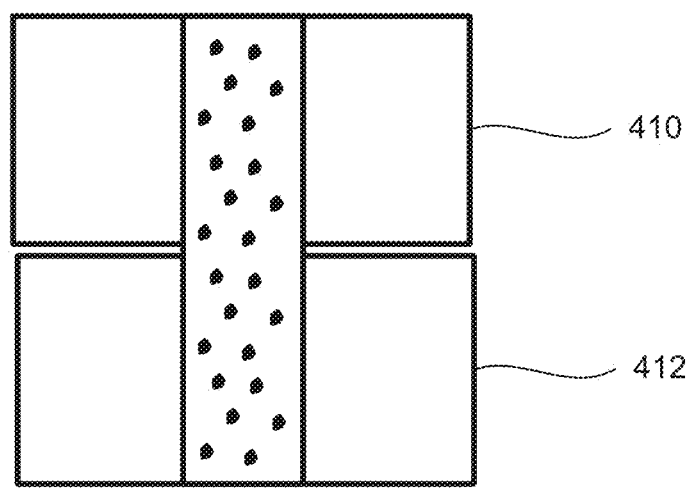
FIG. 4B illustrates a process apparatus for fabricating multidimensional electrochemically active structures, in accordance with certain embodiments.

FIG. 4B illustrates a process apparatus example for fabricating multidimensional electrochemically active structures in accordance with certain embodiments. One example of the processing apparatus is a fluidized bed reactor that has two processing chambers 410 and 412, each configured to operate at different processing conditions described above. For example, the chamber 410 may be used to form silicide nanowires on metallic supports using a thermal CVD technique. The intermediate structures with silicide nanowires may be then fed (e.g., directly fed) into the second chamber 412 to coat them with an active material layer. The processing apparatus may also be used to direct the final multidimensional structures to the electrode substrate and deposit these structures on the substrate.

Electrode and Battery Arrangements

Figure 5A:
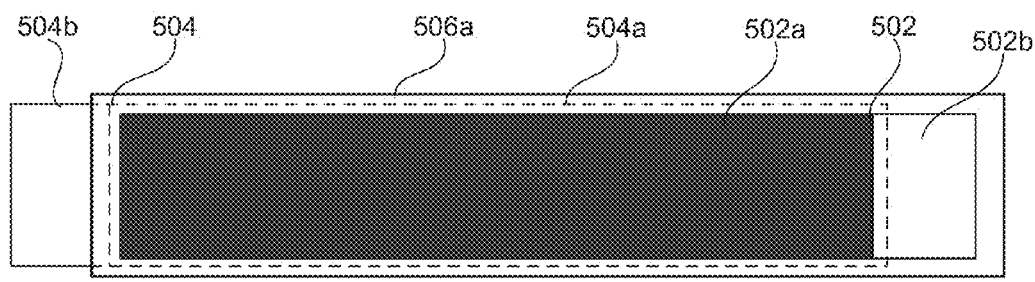
FIGS. 5A-B are top and side schematic views of an illustrative electrode arrangement, in accordance with certain embodiments.
Figure 5B:
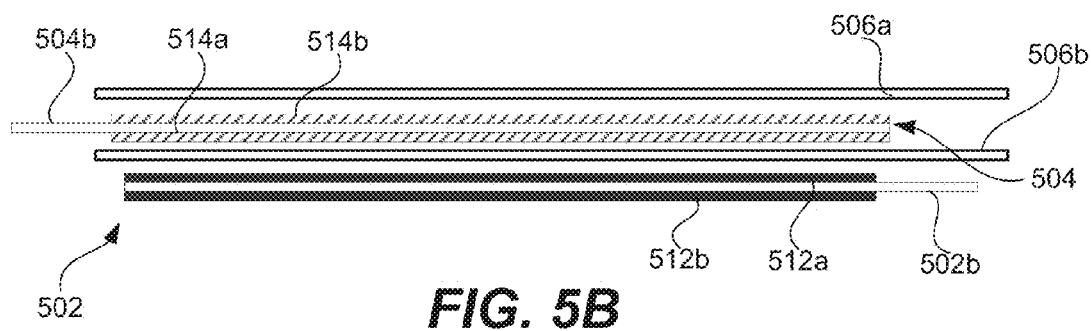

Electrodes are typically assembled into a stack or a jelly roll. FIGS. 5A and 5B illustrates a side and top views of an aligned stack including a positive electrode 502, a negative electrode 504, and two sheets of the separator 506a and 506b, in accordance with certain embodiments. The positive electrode 502 may have a positive active layer 502a and a positive uncoated substrate portion 502b. Similarly, the negative electrode 504 may have a negative active layer 504a and a negative uncoated substrate portion 504b. In many embodiments, the exposed area of the negative active layer 504a is slightly larger that the exposed area of the positive active layer 502a to ensure that most or all lithium ions released from the positive active layer 502a go into the negative active layer 504a. In one embodiment, the negative active layer 504a extends at least between about 0.25 and 5 mm beyond the positive active layer 502a in one or more directions (typically all directions). In a more specific embodiment, the negative layer extends beyond the positive layer by between about 1 and 2 mm in one or more directions. In certain embodiments, the edges of the separator sheets 506a and 506b extend beyond the outer edges of at least the negative active layer 504a to provide electronic insulation of the electrode from the other battery components. The positive uncoated substrate portion 502b may be used for connecting to the positive terminal and may extend beyond negative electrode 504 and/or the separator sheets 506a and 506b. Likewise, the negative uncoated portion 504b may be used for connecting to the negative terminal and may extend beyond positive electrode 502 and/or the separator sheets 506a and 506b.

The positive electrode 502 is shown with two positive active layers 512a and 512b on opposite sides of the flat positive current collector 502b. Similarly, the negative electrode 504 is shown with two negative active layers 514a and 514b on opposite sides of the flat negative current collector. Any gaps between the positive active layer 512a, its corresponding separator sheet 506a, and the corresponding negative active layer 514a are usually minimal to non-existent, especially after the first cycle of the cell. The electrodes and the separators are either tightly wound together in a jelly roll or are positioned in a stack that is then inserted into a tight case. The electrodes and the separator tend to swell inside the case after the electrolyte is introduced, and the first cycles remove any gaps or dry areas as lithium ions cycle the two electrodes and through the separator.

Figure 6A:
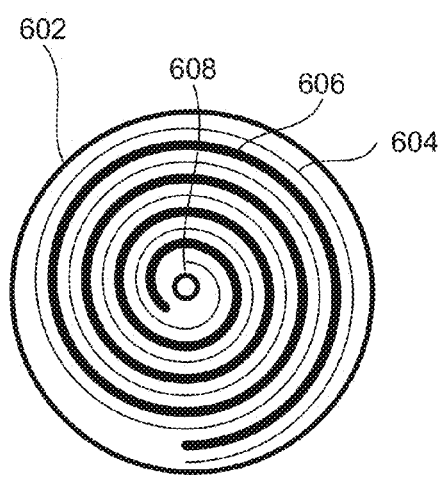
FIGS. 6A-B are top and perspective schematic views of an illustrative round wound cell in accordance with certain embodiments.
Figure 6B:
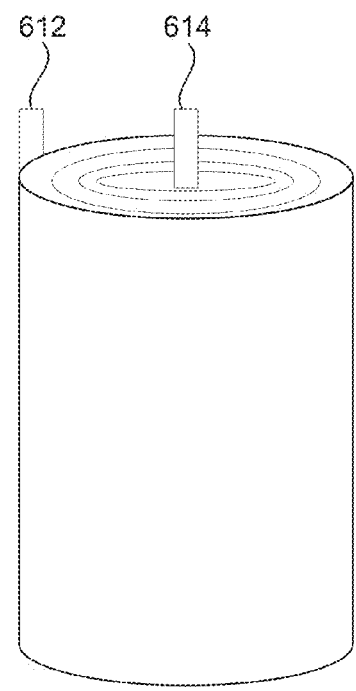

A wound design is a common arrangement. Long and narrow electrodes are wound together with two sheets of separator into a sub-assembly (sometimes referred to as a jellyroll), which is shaped and sized according to the internal dimensions of a curved, often cylindrical, case. FIG. 6A shows a top view of a jelly roll comprising a positive electrode 606 and a negative electrode 604. The white spaces between the electrodes represent the separator sheets. The jelly roll is inserted into a case 602. In some embodiments, the jellyroll may have a mandrel 608 inserted in the center that establishes an initial winding diameter and prevents the inner winds from occupying the center axial region. The mandrel 608 may be made of conductive material, and, in some embodiments, it may be a part of a cell terminal. FIG. 6B presents a perspective view of the jelly roll with a positive tab 612 and a negative tab 614 extending from the jelly roll. The tabs may be welded to the uncoated portions of the electrode substrates.

The length and width of the electrodes depend on the overall dimensions of the cell and the heights of the active layers and current collector. For example, a conventional 18650 cell with 18 mm diameter and 65 mm length may have electrodes that are between about 300 and 1000 mm long. Shorter electrodes corresponding to low rate/higher capacity applications are thicker and have fewer winds.

A cylindrical design may be desirable for some lithium ion cells because the electrodes swell during cycling and exert pressure on the casing. A round casing may be made sufficiently thin and still maintain sufficient pressure. Prismatic cells may be similarly wound, but their case may bend along the longer sides from the internal pressure. Moreover, the pressure may not be even within different parts of the cells, and the corners of the prismatic cell may be left empty. Empty pockets may not be desirable within the lithium ions cells because electrodes tend to be unevenly pushed into these pockets during electrode swelling. Moreover, the electrolyte may aggregate and leave dry areas between the electrodes in the pockets, which negatively affects the lithium ion transport between the electrodes. Nevertheless, for certain applications, such as those dictated by rectangular form factors, prismatic cells are appropriate. In some embodiments, prismatic cells employ stacks of rectangular electrodes and separator sheets to avoid some of the difficulties encountered with wound prismatic cells.

Figure 7:
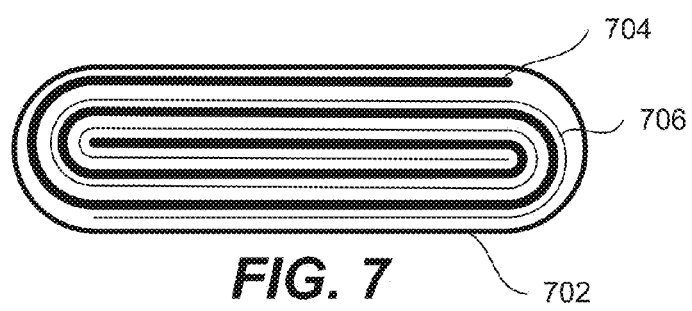
FIG. 7 is a top schematic view of an illustrative prismatic wound cell, in accordance with certain embodiments.

FIG. 7 illustrates a top view of a wound prismatic jellyroll positions in a case 702. The jelly roll comprises a positive electrode 704 and a negative electrode 706. The white space between the electrodes is representative of the separator sheets. The jelly roll is inserted into a rectangular prismatic case. Unlike the cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 8A:
FIGS. 8A-B are top and perspective schematic views of an illustrative stack of electrodes and separator sheets, in accordance with certain embodiments.
Figure 8B:
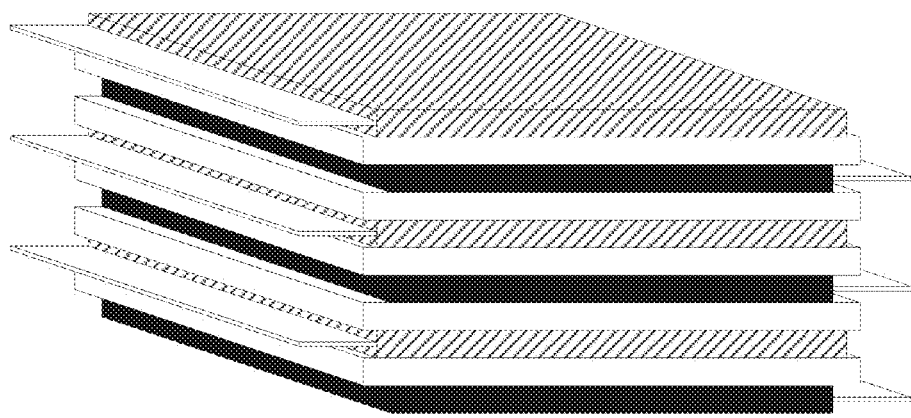

FIG. 8A illustrates a side view of a stacked cell 800 that includes a plurality of sets (801a, 801b, and 801c) of alternating positive and negative electrodes and a separator in between the electrodes. A stacked cell can be made to almost any shape, which is particularly suitable for prismatic cells. However, such a cell typically requires multiple sets of positive and negative electrodes and a more complicated alignment of the electrodes. The current collector tabs typically extend from each electrode and connect to an overall current collector leading to the cell terminal.

Once the electrodes are arranged as described above, the cell is filled with electrolyte. The electrolyte in lithium ions cells may be liquid, solid, or gel. The lithium ion cells with the solid electrolyte are referred to as a lithium polymer cells.

A typical liquid electrolyte comprises one or more solvents and one or more salts, at least one of which includes lithium. During the first charge cycle (sometimes referred to as a formation cycle), the organic solvent in the electrolyte can partially decompose on the negative electrode surface to form a SEI layer. The interphase is generally electrically insulating but ionically conductive, thereby allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combinations thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment, the total concentration of salt in a liquid nonaqueous solvent (or combination of solvents) is at least about 0.3 M; in a more specific embodiment, the salt concentration is at least about 0.7M. The upper concentration limit may be driven by a solubility limit or may be no greater than about 2.5 M; in a more specific embodiment, it may be no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PNMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 9:
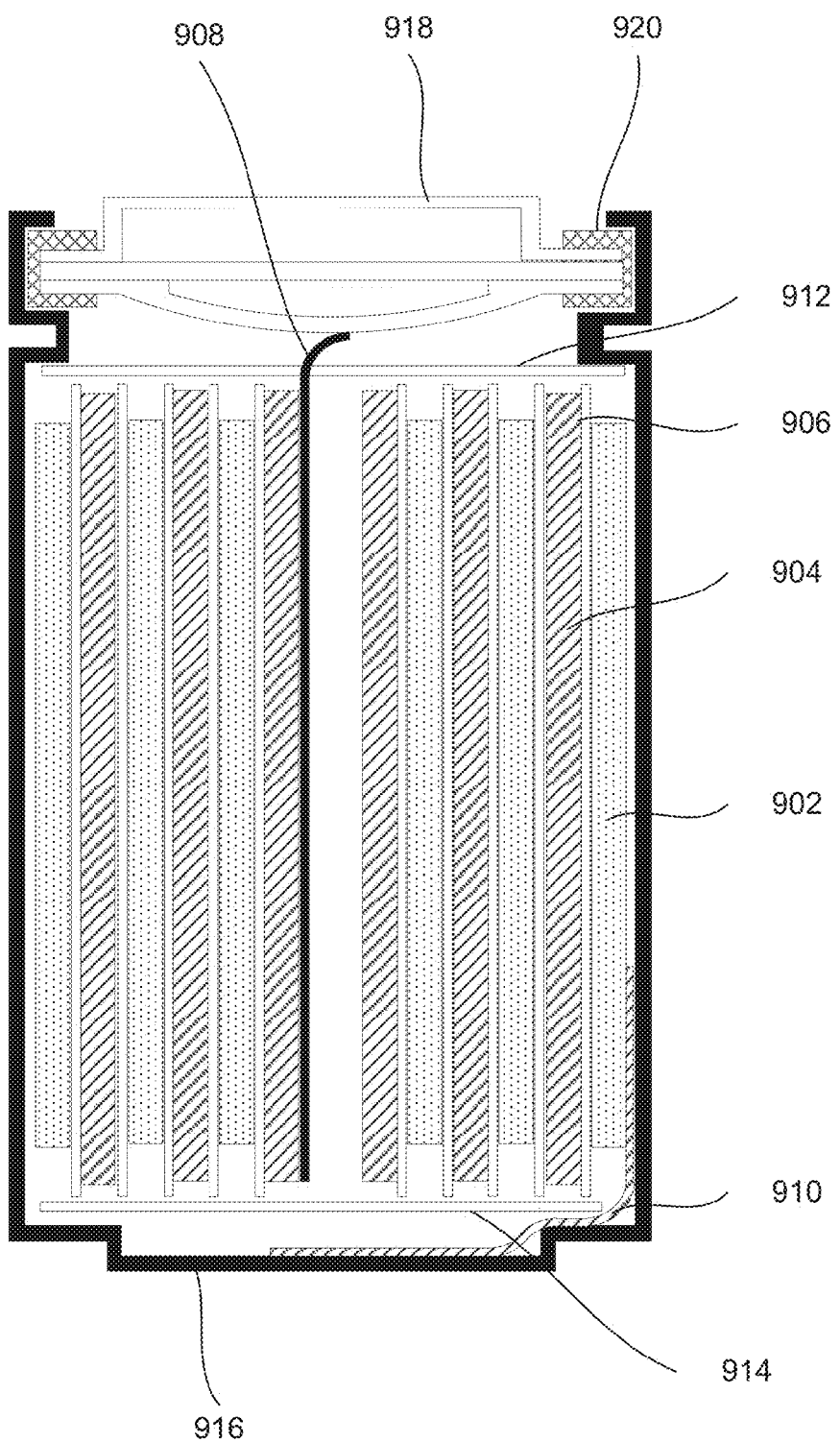
FIG. 9 is a schematic cross-section view of an example of a wound cell, in accordance with embodiments.

FIG. 9 illustrates a cross-section view of a wound cylindrical cell, in accordance with one embodiment. A jelly roll comprises a spirally wound positive electrode 902, a negative electrode 904, and two sheets of the separator 906. The jelly roll is inserted into a cell case 916, and a cap 918 and gasket 920 are used to seal the cell. It should be noted that in certain embodiments a cell is not sealed until after subsequent operations. In some cases, cap 918 or cell case 916 includes a safety device. For example, a safety vent or burst valve may be employed to open if excessive pressure builds up in the battery. In certain embodiments, a one-way gas release valve is included to release oxygen that has been released during activation of the positive material. Also, a positive thermal coefficient (PTC) device may be incorporated into the conductive pathway of cap 918 to reduce the damage that might result if the cell suffered a short circuit. The external surface of the cap 918 may be used as the positive terminal, while the external surface of the cell case 916 may serve as the negative terminal. In an alternative embodiment, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 and 912 may be inserted to prevent the possibility of internal shorting. For example, a Kapton™ film may be used for internal insulation. During fabrication, the cap 918 may be crimped to the cell case 916 in order to seal the cell. However, prior to this operation, electrolyte (not shown) is added to fill the porous spaces of the jelly roll.

A rigid case is typically used for lithium ion cells, while lithium polymer cells may be packed into flexible, foil-type (polymer laminate) cases. A variety of materials can be chosen for the cases. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

In addition to the battery applications described above, metal silicides may be used in fuel cells (e.g., for anodes, cathodes, and electrolytes), hetero junction solar cell active materials, various forms of current collectors, and/or absorption coatings. Some of these applications can benefit from a high surface area provided by metal silicide structures, high conductivity of silicide materials, and fast inexpensive deposition techniques.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:
1. A battery electrode structure for use in a battery, the battery electrode structure comprising:

a conductive substrate; and a plurality of multidimensional electrochemically active structures attached to and in electronic communication with the conductive substrate, wherein each of the multidimensional electrochemically active structures comprises:

a support comprising metal;

nanowires comprising support-rooted ends attached to the support and free ends extending in different directions away from the support, the nanowires comprising metal silicide of the metal; and a layer coating the nanowires, the layer comprising an electrochemically active material for inserting and releasing electrochemically active ions during cycling of the battery.

2. The battery electrode structure of claim 1, wherein the metal silicide is selected from the group consisting of nickel silicide, cobalt silicide, copper silicide, silver silicide, chromium silicide, titanium silicide, aluminum silicide, zinc silicide, and iron silicide.

3. The battery electrode structure of claim 1, wherein the metal silicide comprises at least two different nickel silicide phases selected from the group consisting of $Ni_2Si$, $NiSi$, and $NiSi_2$.

4. The battery electrode structure of claim 1, wherein the electrochemically active material is selected from the group consisting of crystalline silicon, amorphous silicon, a silicon oxide, a silicon oxy-nitride, a tin containing material, a germanium containing material, and a carbon containing material.

5. The battery electrode structure of claim 1, wherein the nanowires are between about 1 micrometer and 200 micrometers in length on average.

6. The battery electrode structure of claim 1, wherein the nanowires are less than about 100 nanometers in diameter on average.

7. The battery electrode structure of claim 1, wherein the layer of the electrochemically active material is at least about 100 nanometers in thickness on average.

8. The battery electrode structure of claim 1, wherein a volume ratio of the electrochemically active material to the metal silicide is at least about 5.

9. The battery electrode structure of claim 1, wherein, prior to cycling of the battery, the electrochemically active material is doped with one or more materials selected from the group consisting of: phosphorous, boron, gallium, and lithium.

10. The battery electrode structure of claim 1, further comprising a shell formed over the layer of the electrochemically active material, the shell comprising one or more materials selected from the group consisting of carbon, copper, fluorine, a polymer, a sulfide, Lithium Phosphorous Oxynitride (LIPON), and a metal oxide.

11. The battery electrode structure of claim 1, further comprising a substrate layer formed over the conductive substrate and comprising the electrochemically active material, the substrate layer forming joint structures with the layer coating the nanowires, the joint structures provide attachment to some of the plurality of multidimensional electrochemically active structures to the conductive substrate and electronic communication with the conductive substrate.

12. The battery electrode structure of claim 1, wherein portions of the layer of the electrochemical active materials coating the nanowires form joint structures with each other.

13. The battery electrode structure of claim 1, further comprising a polymeric binder attaching the plurality of multidimensional electrochemically active structures to the conductive substrate.

14. The battery electrode structure of claim 1, wherein the battery is a lithium ion battery.

15. The battery electrode structure of claim 1, wherein the electrochemically active material has a theoretical lithiation capacity of at least about 800 mAh/g.

16. The battery electrode structure of claim 1, further comprising a nanostructure template including template nanowires rooted to the substrate, wherein the layer of the electrochemically active material coats the template nanowires and the template nanowires provide attachment and electronic communication to the plurality of multidimensional electrochemically active structures with respect to the conductive substrate.

17. The battery electrode structure of claim 1, wherein the layer of the electrochemically active material is at least twice as thick at the free ends of the nanowires than at the support-rooted ends.

18. The battery electrode structure of claim 1, wherein the layer of the electrochemically active material comprises amorphous silicon and germanium, and wherein the layer has more silicon and less germanium at the free ends of the nanowires than at the support-rooted ends.

19. The battery electrode structure of claim 1, further comprising an intermediate sub-layer positioned between the nanowires and the layer of the electrochemically active material and configured to improve metallurgical attachment and electronic conductivity between the nanowires and the layer of the electrochemically active material.

20. The battery electrode structure of claim 1, further comprising an intermediate sub-layer positioned between the nanowires and the layer of the electrochemically active material and configured to provide an elastic interface between the nanowires and the layer of the electrochemically active material.

21. The battery electrode structure of claim 1, further comprising a base sub-layer adjacent to the substrate, the base sub-layer being substantially free of the metal of the metal silicide.

22. The battery electrode structure of claim 1, wherein the conductive substrate comprises one or more material selected from the group consisting of copper, nickel, titanium, and stainless steel.

23. The battery electrode structure of claim 1, wherein the battery electrode structure is a part of a negative electrode.

24. The battery electrode structure of claim 1, wherein the battery electrode structure is a part of a positive electrode.

25. A lithium ion cell comprising:

a conductive substrate; and a plurality of multidimensional electrochemically active structures attached to and in electronic communication with the conductive substrate, wherein each of the multidimensional electrochemically active structures comprises:

a support comprising metal;

nanowires comprising support-rooted ends attached to the support and free-ends extending in different directions away from the support, the nanowires comprising a material selected from the group consisting of metal silicide of the metal, carbon nanotubes, and combinations thereof; and a layer coating the nanowires, the layer comprising an electrochemically active material for inserting and releasing electrochemically active ions during cycling of the lithium ion cell.

26. The battery electrode structure of claim 1, further comprising an intermediate sublayer positioned between the nanowires and the layer of the electrochemically active material.

27. The battery electrode structure of claim 26, wherein the intermediate sub-layer comprises a metal alloy.

28. The battery electrode structure of claim 26, wherein the intermediate sub-layer comprises one or more of titanium, copper, nickel, aluminum, zinc, and alloys thereof.

29. A method of fabricating multidimensional electrochemically active structures, the method comprising:
  receiving supports comprising metal;
  forming nanowires comprising support-rooted ends attached to the supports and free-ends extending into different directions away from the supports, the nanowires comprising metal silicide of the metal; and
  forming a layer coating the nanowires, the layer comprising an electrochemically active material for inserting and releasing electrochemically active ions during cycling of the electrochemically active material.

30. The method of claim 29, wherein the supports have one or more shapes selected from the group consisting of particles, rods, and flakes.

\* \* \* \* \*